United States Patent
Yamada et al.

(10) Patent No.: US 12,163,555 B2
(45) Date of Patent: *Dec. 10, 2024

(54) BEARING PART AND ROLLING BEARING

(71) Applicant: NTN CORPORATION, Osaka (JP)

(72) Inventors: Masahiro Yamada, Kuwana (JP); Chikara Ohki, Kuwana (JP)

(73) Assignee: NTN CORPORATION, Osaka (JP)

( * ) Notice: Subject to any disclaimer, the term of this patent is extended or adjusted under 35 U.S.C. 154(b) by 1211 days.

This patent is subject to a terminal disclaimer.

(21) Appl. No.: 16/954,997

(22) PCT Filed: Dec. 5, 2018

(86) PCT No.: PCT/JP2018/044709
§ 371 (c)(1),
(2) Date: Jun. 17, 2020

(87) PCT Pub. No.: WO2019/124074
PCT Pub. Date: Jun. 27, 2019

(65) Prior Publication Data
US 2020/0378442 A1    Dec. 3, 2020

(30) Foreign Application Priority Data

Dec. 18, 2017 (JP) ................. 2017-241498

(51) Int. Cl.
*F16C 33/62* (2006.01)
*C21D 1/06* (2006.01)
(Continued)

(52) U.S. Cl.
CPC ............... *F16C 33/62* (2013.01); *C21D 1/06* (2013.01); *C21D 9/36* (2013.01); *C21D 9/40* (2013.01);
(Continued)

(58) Field of Classification Search
CPC ............. C21D 1/06; C21D 9/36; C21D 9/38; C21D 9/40; C21D 2211/008; C23C 8/22;
(Continued)

(56) References Cited

U.S. PATENT DOCUMENTS

| | | |
|---|---|---|
| 5,084,116 A | 1/1992 | Mitamura |
| 5,338,377 A | 8/1994 | Mitamura et al. |

(Continued)

FOREIGN PATENT DOCUMENTS

| | | |
|---|---|---|
| CN | 1421541 A | 6/2003 |
| CN | 1611628 A | 5/2005 |

(Continued)

OTHER PUBLICATIONS

Chinese Office Action issued in corresponding Chinese Patent Application No. 201880015417.1, dated Apr. 20, 2022, with English translation.

(Continued)

*Primary Examiner* — Vanessa T. Luk
(74) *Attorney, Agent, or Firm* — Rimon P.C.

(57) ABSTRACT

A bearing part according to one embodiment of the present invention is a bearing part composed of a chromium molybdenum steel, the bearing part including a diffusion layer in a surface of the bearing part. The diffusion layer includes a plurality of compound grains and a plurality of martensite blocks. An average grain size of the compound grains is less than or equal to 0.3 μm. An area ratio of the compound grains in the diffusion layer is more than or equal to 3%. A maximum grain size of the plurality of martensite blocks is less than or equal to 3.8 μm.

14 Claims, 25 Drawing Sheets

(51) Int. Cl.
| | |
|---|---|
| *C21D 9/36* | (2006.01) |
| *C21D 9/40* | (2006.01) |
| *C22C 38/00* | (2006.01) |
| *C22C 38/02* | (2006.01) |
| *C22C 38/04* | (2006.01) |
| *C22C 38/44* | (2006.01) |
| *C23C 8/32* | (2006.01) |
| *C23C 8/80* | (2006.01) |

(52) U.S. Cl.
CPC ............ *C22C 38/002* (2013.01); *C22C 38/02* (2013.01); *C22C 38/04* (2013.01); *C22C 38/44* (2013.01); *C23C 8/32* (2013.01); *C23C 8/80* (2013.01); *C21D 2211/008* (2013.01); *F16C 2204/70* (2013.01)

(58) Field of Classification Search
CPC .... C23C 8/26; C23C 8/32; C23C 8/46; C23C 8/50; C23C 8/56; C23C 8/66; C23C 8/70; C23C 8/76
See application file for complete search history.

(56) References Cited

U.S. PATENT DOCUMENTS

| | | | |
|---|---|---|---|
| 5,660,647 | A | 8/1997 | Mitamura et al. |
| 5,672,014 | A | 9/1997 | Okita et al. |
| 5,853,249 | A | 12/1998 | Maeda et al. |
| 6,095,692 | A | 8/2000 | Takemura |
| 6,149,734 | A | 11/2000 | Isogai et al. |
| 6,290,398 | B1 | 9/2001 | Fujiwara et al. |
| 8,535,457 | B2 | 9/2013 | Maeda |
| 11,137,031 | B2 * | 10/2021 | Yamada ............... F16C 19/06 |
| 2001/0001396 | A1 | 5/2001 | Takayama et al. |
| 2003/0123769 | A1 | 7/2003 | Ohki |
| 2008/0006347 | A1 | 1/2008 | Kizawa et al. |
| 2008/0047633 | A1 | 2/2008 | Kizawa et al. |
| 2008/0118196 | A1 | 5/2008 | Watanabe et al. |
| 2010/0150489 | A1 | 6/2010 | Maeda |
| 2012/0020605 | A1 | 1/2012 | Mori |
| 2013/0301969 | A1 * | 11/2013 | Yuki ...................... C21D 9/40 384/456 |
| 2014/0363115 | A1 | 12/2014 | Yamada et al. |
| 2016/0333438 | A1 | 11/2016 | Sakamoto et al. |

FOREIGN PATENT DOCUMENTS

| | | | |
|---|---|---|---|
| CN | 102362000 | A | 2/2012 |
| EP | 1517058 | A1 | 3/2005 |
| JP | H02-277764 | A | 11/1990 |
| JP | H03-64431 | A | 3/1991 |
| JP | H05-078814 | A | 3/1993 |
| JP | H08-49057 | A | 2/1996 |
| JP | H08-303470 | A | 11/1996 |
| JP | H08-311603 | A | 11/1996 |
| JP | H10-176219 | A | 6/1998 |
| JP | H11-201168 | A | 7/1999 |
| JP | H11-217626 | A | 8/1999 |
| JP | 2001-323939 | A | 11/2001 |
| JP | 2005-090680 | A | 4/2005 |
| JP | 2005314789 | A * | 11/2005 |
| JP | 2006-083988 | A | 3/2006 |
| JP | 2007-016848 | A | 1/2007 |
| JP | 2007-232201 | A | 9/2007 |
| JP | 2008-255399 | A | 10/2008 |
| JP | 2008-285725 | A | 11/2008 |
| JP | 2011-184768 | A | 9/2011 |
| JP | 2013-011010 | A | 1/2013 |
| JP | 2014/101896 | A | 6/2014 |
| WO | 2006/068205 | A1 | 6/2006 |
| WO | 2015/105187 | A1 | 7/2015 |

OTHER PUBLICATIONS

"Metal Materials and Heat Treatment," compiled by the Agricultural Machinery Industry Bureau of the Ministry of Machinery Industry, Machinery Industry Press, Aug. 1987, p. 108, with partial English translation.

Japanese Office Action issued in correspondiing Japanese Patent Application No. 2017-241498, dated Dec. 22, 2020, with English translation.

International Search Report issued in corresponding International Patent Application No. PCT/JP2018/044709, dated Feb. 19, 2019, with English translation.

Chinese Office Action issued in corresponding Chinese Patent Application No. 201880015417.1, dated Jun. 9, 2021, with English translation.

Extended European Search Report issued in corresponding European Patent Application No. 18760826.0, dated Jul. 3, 2020.

International Search Report issued in corresponding International Patent Application No. PCT/JP2018/008147 dated May 1, 2018, with English translation.

Japanese Office Action issued in corresponding Japanese Patent Application No. 2021-006648, dated Sep. 21, 2021, with English translation.

Japanese Office Action issued in corresponding Japanese Patent Application No. 2021-006650, dated Sep. 21, 2021, with English translation.

Japanese Office Action issued in corresponding Japanese Patent Application No. 2021-006653, dated Sep. 21, 2021, with English translation.

* cited by examiner

BEARING PART AND ROLLING BEARING

CROSS REFERENCE TO RELATED APPLICATIONS

This patent application is the U.S. National Phase under 35 U.S.C. § 371 of International Application No. PCT/JP2018/044709, filed on Dec. 5, 2018, which claims the benefit of Japanese Patent Application No. 2017-241498, dated Dec. 18, 2017, the entire contents of each are hereby incorporated by reference in their entirety.

TECHNICAL FIELD

The present invention relates to a bearing part and a rolling bearing.

BACKGROUND ART

Conventionally, a bearing part composed of a chromium (Cr) molybdenum (Mo) steel has been known. Such a conventional bearing part composed of a chromium molybdenum steel is manufactured by performing a carbonitriding process onto a surface of a processing target member composed of a chromium molybdenum steel and then performing quenching and tempering thereto. However, the conventional bearing part composed of a chromium molybdenum steel has room for improvement in terms of a surface damage resistance. That is, the conventional bearing part composed of a chromium molybdenum steel may be broken at an early stage when used under a foreign matter introduction environment. In order to improve the surface damage resistance, it is desired to improve wear resistance and toughness in a surface of the bearing part.

In order to improve the wear resistance and toughness in the surface of the bearing part, it is effective to precipitate a hard and fine compound and obtain a resultant fine martensite block. However, in a chromium molybdenum steel having relatively small contents of carbon and an alloy element, it is difficult to precipitate such a hard and fine compound through a carbonitriding process.

To address this, generation of the hard and fine compound is promoted by adding several % to ten several % of a carbide-forming or nitride-forming element such as silicon (Si), manganese (Mn), chromium, molybdenum, vanadium (V), titanium (Ti) or the like in a steel material described in each of Japanese Patent Laying-Open No. 2-277764 (Patent Literature 1), Japanese Patent Laying-Open No. 3-64431 (Patent Literature 2), Japanese Patent Laying-Open No. 8-49057 (Patent Literature 3), Japanese Patent Laying-Open No. 8-311603 (Patent Literature 4), Japanese Patent Laying-Open No. 11-201168 (Patent Literature 5), Japanese Patent Laying-Open No. 2001-323939 (Patent Literature 6), Japanese Patent Laying-Open No. 2007-232201 (Patent Literature 7) and Japanese Patent Laying-Open No. 2013-11010 (Patent Literature 8).

CITATION LIST

Patent Literature

PTL 1: Japanese Patent Laying-Open No. 2-277764
PTL 2: Japanese Patent Laying-Open No. 3-64431
PTL 3: Japanese Patent Laying-Open No. 8-49057
PTL 4: Japanese Patent Laying-Open No. 8-311603
PTL 5: Japanese Patent Laying-Open No. 11-201168
PTL 6: Japanese Patent Laying-Open No. 2001-323939
PTL 7: Japanese Patent Laying-Open No. 2007-232201
PTL 8: Japanese Patent Laying-Open No. 2013-11010

SUMMARY OF INVENTION

Technical Problem

However, when each of the steel materials described in Patent Literature 1 to Patent Literature 8 is used, cost of the steel material is increased due to the increased content of the alloy element. Moreover, when each of the steel materials described in Patent Literature 1 to Patent Literature 8 is used, the increased content of the alloy element may lead to decreased toughness, decreased processability (forgeability, cuttability, grindability or the like), and increased process cost resulting from decreased carburizability.

The present invention has been made in view of the above-described problem of the conventional art. More specifically, the present invention provides a bearing part and a rolling bearing to secure wear resistance and toughness while suppressing increased cost of the steel material and increased process cost resulting from an increased content of an alloy element.

Solution to Problem

A bearing part according to one embodiment of the present invention is a bearing part composed of a chromium molybdenum steel, the bearing part including a diffusion layer in a surface of the bearing part. The diffusion layer includes a plurality of compound grains and a plurality of martensite blocks. An average grain size of the compound grains is less than or equal to 0.3 μm. An area ratio of the compound grains in the diffusion layer is more than or equal to 3%. A maximum grain size of the plurality of martensite blocks is less than or equal to 3.8 μm.

In the bearing part, the plurality of martensite blocks may include martensite blocks each having a crystal grain size of less than or equal to 1.0 μm and constituting a first group. A value obtained by dividing a total area of the martensite blocks belonging to the first group by a total area of the plurality of martensite blocks may be more than or equal to 0.55 and less than or equal to 0.75.

In the bearing part, the plurality of martensite blocks may include martensite blocks belonging to a second group, and martensite blocks belonging to a third group. A minimum value of crystal grain sizes of the martensite blocks belonging to the third group may be larger than a maximum value of crystal grain sizes of the martensite blocks included in the second group. A value obtained by dividing a total area of the martensite blocks belonging to the third group by a total area of the plurality of martensite blocks may be more than or equal to 0.5. A value obtained by dividing, by the total area of the plurality of martensite blocks, a total area of the martensite blocks belonging to the third group except for a martensite block that has a maximum crystal grain size and that belongs to the third group may be less than 0.5. An average grain size of the martensite blocks belonging to the third group may be more than or equal to 0.7 μm and less than or equal to 1.4 μm.

In the bearing part, the plurality of martensite blocks may include martensite blocks belonging to a fourth group, and martensite blocks belonging to a fifth group. A minimum value of crystal grain sizes of the martensite blocks belonging to the fifth group may be larger than a maximum value of crystal grain sizes of the martensite blocks included in the fourth group. A value obtained by dividing a total area of the martensite blocks belonging to the fifth group by a total area of the plurality of martensite blocks may be more than or equal to 0.7. A value obtained by dividing, by the total area of the plurality of martensite blocks, a total area of the martensite blocks belonging to the fifth group except for a martensite block that has a maximum crystal grain size and that belongs to the fifth group may be less than 0.7. An average grain size of the martensite blocks belonging to the fifth group may be more than or equal to 0.6 μm and less than or equal to 1.1 μm.

In the bearing part, the plurality of martensite blocks may include martensite blocks belonging to a second group, and martensite blocks belonging to a third group. A minimum value of crystal grain sizes of the martensite blocks belonging to the third group may be larger than a maximum value of crystal grain sizes of the martensite blocks included in the second group. A value obtained by dividing a total area of the martensite blocks belonging to the third group by a total area of the plurality of martensite blocks may be more than or equal to 0.5. A value obtained by dividing, by the total area of the plurality of martensite blocks, a total area of the martensite blocks belonging to the third group except for a martensite block that has a maximum crystal grain size and that belongs to the third group may be less than 0.5. An average aspect ratio of the martensite blocks belonging to the third group may be more than or equal to 2.5 and less than or equal to 2.8.

In the bearing part, the plurality of martensite blocks may include martensite blocks belonging to a fourth group, and martensite blocks belonging to a fifth group. A minimum value of crystal grain sizes of the martensite blocks belonging to the fifth group may be larger than a maximum value of crystal grain sizes of the martensite blocks included in the fourth group. A value obtained by dividing a total area of the martensite blocks belonging to the fifth group by a total area of the plurality of martensite blocks may be more than or equal to 0.7. A value obtained by dividing, by the total area of the plurality of martensite blocks, a total area of the martensite blocks belonging to the fifth group except for a martensite block that has a maximum crystal grain size and that belongs to the fifth group may be less than 0.7. An average aspect ratio of the martensite blocks belonging to the fifth group may be more than or equal to 2.4 and less than or equal to 2.6.

In the bearing part, an average grain size of prior austenite grains in the diffusion layer may be less than or equal to 8 μm.

In the bearing part, an average carbon concentration in the diffusion layer between the surface and a position distant away by 10 μm from the surface may be more than or equal to 0.7 mass %. An average nitrogen concentration in the diffusion layer between the surface and the position distant away by 10 μm from the surface may be more than or equal to 0.2 mass %.

In the bearing part, the chromium molybdenum steel may be SCM435 defined in JIS.

A rolling bearing according to one embodiment of the present invention includes: an outer ring composed of a chromium molybdenum steel, the outer ring having an inner circumferential surface provided with a first raceway surface; an inner ring composed of a chromium molybdenum steel, the inner ring having an outer circumferential surface provided with a second raceway surface, the inner ring being disposed such that the second raceway surface faces the first raceway surface; and a rolling element composed of a chromium molybdenum steel, the rolling element being disposed rollably between the first raceway surface and the second raceway surface, the rolling element having a rolling contact surface. A diffusion layer is provided in at least one of the first raceway surface, the second raceway surface, and the rolling contact surface. The diffusion layer includes a plurality of compound grains and a plurality of martensite blocks. An average grain size of the compound grains is less than or equal to 0.3 μm. An area ratio of the compound grains in the diffusion layer is more than or equal to 3%. A maximum grain size of the plurality of martensite blocks is less than or equal to 3.8 μm.

Advantageous Effects of Invention

Each of the bearing part and the rolling bearing according to one embodiment of the present invention is composed of a chromium molybdenum steel. Hence, a content of an alloy element is relatively low, and cost of the steel material and process cost can be suppressed.

In the diffusion layer of each of the bearing part and the rolling bearing according to one embodiment of the present invention, the average grain size of the compound grains is less than or equal to 0.3 μm, and the area ratio of the compound grains is more than or equal to 3%. That is, in the diffusion layer of each of the bearing part and the rolling bearing according to one embodiment of the present invention, a large amount of relatively hard and fine compound is dispersed in the vicinity of the surface thereof. Moreover, in the diffusion layer of each of the bearing part and the rolling bearing according to one embodiment of the present invention, the maximum grain size of the martensite blocks is less than or equal to 3.8 μm. Therefore, in each of the bearing part and the rolling bearing according to one embodiment of the present invention, wear resistance can be improved due to reinforcement provided by the fine martensite blocks and the dispersion of the hard and fine compound, without compromising toughness in the surface.

DESCRIPTION OF EMBODIMENTS

Figure 1:
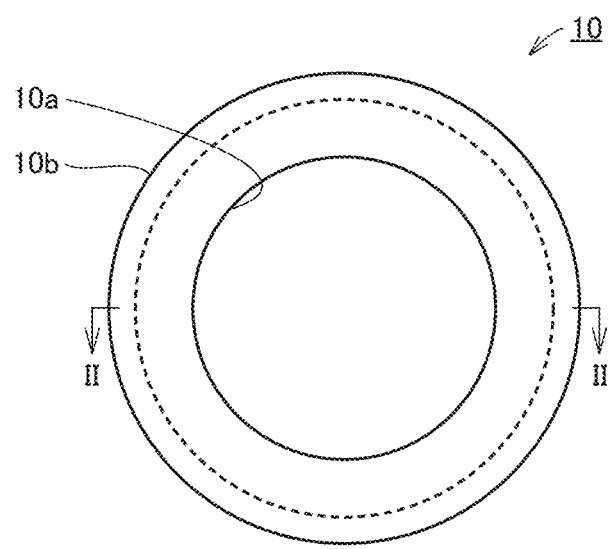
FIG. 1 is an top view of a bearing part according to an embodiment.

The following describes details of an embodiment with reference to figures. It should be noted that in the figures below, the same or corresponding portions are given the same reference characters and are not described repeatedly.
(Bearing Part According to Embodiment)

The following describes a configuration of a bearing part according to an embodiment.

Figure 2:
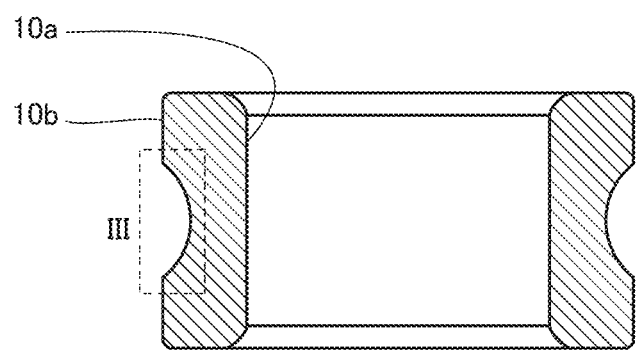
FIG. 2 is a cross sectional view along II-II of FIG. 1.

FIG. 1 is a top view of the bearing part according to the embodiment. FIG. 2 is a cross sectional view along II-II of FIG. 1. As shown in FIG. 1 and FIG. 2, the bearing part according to the embodiment is an inner ring 10 of a deep groove ball bearing, for example. The bearing part according to the embodiment is not limited to this. The bearing part according to the embodiment may be an outer ring of a deep groove ball bearing, or may be a rolling element of the deep groove ball bearing, for example.

Inner ring 10 is composed of a chromium molybdenum steel. The chromium molybdenum steel used for inner ring 10 is a steel belonging to a type of SCM steel defined in JIS (JIS G 4053: 2008), for example. The chromium molybdenum steel used for inner ring 10 may be SCM435 defined in JIS.

Inner ring 10 has surfaces. More specifically, inner ring 10 has an inner circumferential surface 10a and an outer circumferential surface 10b. Inner circumferential surface 10a is a surface at a side to which a shaft is attached. Outer circumferential surface 10b is a surface that constitutes a raceway surface of inner ring 10.

Figure 3:
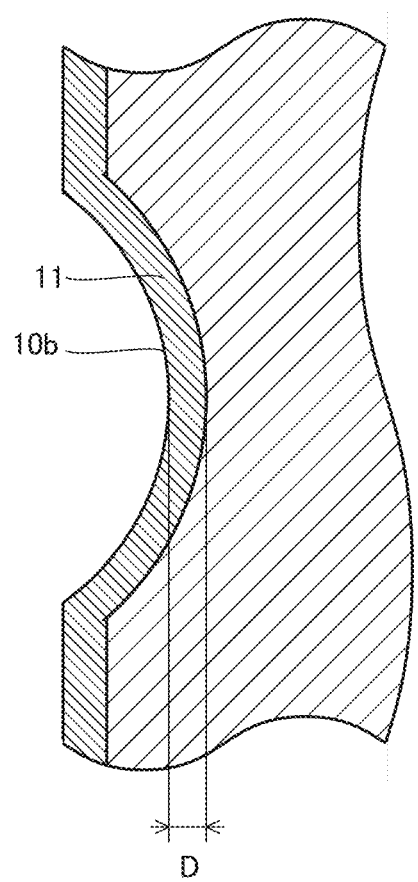
FIG. 3 is an enlarged view in a region III of FIG. 2.

FIG. 3 is an enlarged view of a region III of FIG. 2. As shown in FIG. 3, inner ring 10 has a diffusion layer 11 in its surface (outer circumferential surface 10b). Diffusion layer 11 is a portion having nitrogen and carbon concentrations higher than the nitrogen and carbon concentrations in the chromium molybdenum steel of inner ring 10. Diffusion layer 11 has a depth D of more than or equal to 1 mm and less than or equal to 1.5 mm, for example.

Diffusion layer 11 contains a plurality of compound grains and a plurality of martensite blocks. Each of the compound grains is a crystal grain of an iron (Fe) carbide, an iron nitride, or an iron carbonitride. More specifically, the compound grain is a crystal grain of a compound in which chromium substitutes for part of an iron site of cementite ($Fe_3C$) and nitrogen (N) substitutes for part of a carbon (C) site thereof (i.e., a compound represented by $(Fe,Cr)_3(C,N)$).

The average grain size of the compound grains in diffusion layer 11 is less than or equal to 0.3 μm. The average grain size of the compound grains in diffusion layer 11 is preferably less than or equal to 0.25 μm. The area ratio of the compound grains in diffusion layer 11 is more than or equal to 3%. The area ratio of the compound grains in diffusion layer 11 is preferably more than or equal to 8%. The area ratio of the compound grains in diffusion layer 11 is less than or equal to 10%, for example.

It should be noted that the average grain size and area ratio of the compound grains in diffusion layer 11 are measured by the following method. First, a cross section of diffusion layer 11 is polished. Second, the polished surface is corroded. Third, a SEM (Scanning Electron Microscopy) image capturing is performed to the corroded polished surface (in the description below, an image obtained through the SEM image capturing will be referred to as "SEM image"). It should be noted that the SEM image is captured to include a sufficient number (more than or equal to 20) of compound grains. Fourth, image processing is performed to the obtained SEM image, thereby calculating the area of each compound grain and the total area of the compound grains in the SEM image.

The following relation is established between the equivalent circle diameter of the compound grain and the area of the compound grain: $\pi \times$(the equivalent circle diameter of the compound grain)$^2/4$=the area of the compound grain. Therefore, by calculating the square root of a value obtained by dividing the area of each compound grain in the SEM image by $\pi/4$, the equivalent circle diameter of each compound grain in the SEM image is calculated. The average grain size of the compound grains in diffusion layer 11 is represented by a value obtained by dividing the total of the equivalent circle diameters of the compound grains in the SEM image by the number of the compound grains in the SEM image. The area ratio of the compound grains in diffusion layer 11 is represented by a value obtained by dividing the total area of the compound grains in the SEM image by the area of the SEM image.

Each of the martensite blocks is a block of a martensite phase constituted of crystals with crystal orientations being aligned. The martensite phase is a non-equilibrium phase obtained by quenching an austenite phase of an iron having carbon dissolved therein in a solid state. When a deviation is more than or equal to 15° between the crystal orientation of a block of a first martensite phase and the crystal orientation of a block of a second martensite phase adjacent to the block of the first martensite phase, the block of the first martensite phase and the block of the second martensite phase are different martensite blocks. On the other hand, when the deviation is less than 15° between the crystal orientation of the block of the first martensite phase and the crystal orientation of the block of the second martensite phase adjacent to the block of the first martensite phase, the block of the first martensite phase and the block of the second martensite phase constitute one martensite block.

A maximum grain size of the martensite blocks in diffusion layer 11 is less than or equal to 3.8 μm. The maximum grain size of the martensite blocks in diffusion layer 11 is more than or equal to 3.6 μm, for example.

Martensite blocks included in diffusion layer 11 and having crystal grain sizes of less than or equal to 1 μm constitute a first group. The area ratio of the martensite blocks constituting the first group with respect to the total area of the martensite blocks included in diffusion layer 11 is preferably more than or equal to 0.55 and less than or equal to 0.75.

The martensite blocks included in diffusion layer 11 may be classified into a second group and a third group. The maximum value of the crystal grain sizes of the martensite blocks belonging to the second group is smaller than the minimum value of the crystal grain sizes of the martensite blocks belonging to the third group. A value obtained by dividing the total area of the martensite blocks belonging to the third group by the total area of the martensite blocks included in diffusion layer 11 is more than or equal to 0.5. A value obtained by dividing, by the total area of the martensite blocks included in diffusion layer 11, the total area of the martensite blocks belonging to the third group except for a martensite block that has the maximum crystal grain size and that belongs to the third group is less than 0.5.

From a different viewpoint, it is said that the martensite blocks included in the second group and the martensite blocks belonging to the third group are classified by the following method. That is, first, the martensite blocks are assigned to the second group sequentially from the one having the smallest crystal grain size, and the total area of the martensite blocks assigned to the second group with respect to the total area of the martensite blocks is sequentially calculated. Second, when the ratio of the total area of the martensite blocks assigned to the second group with respect to the total area of the martensite blocks reaches a limit of not more than 50%, the assignment of the martensite blocks to the second group is stopped. Third, martensite blocks not assigned to the second group are assigned to the third group.

Preferably, the average grain size of the martensite blocks included in the third group is more than or equal to 0.7 μm and less than or equal to 1.4 μm. Preferably, the average aspect ratio of the martensite blocks included in the third group is more than or equal to 2.5 and less than or equal to 2.8.

The martensite blocks included in diffusion layer 11 may be classified into a fourth group and a fifth group. The maximum value of the crystal grain sizes of the martensite blocks belonging to the fourth group is smaller than the minimum value of the crystal grain sizes of the martensite blocks belonging to the fifth group. A value obtained by dividing the total area of the martensite blocks belonging to the fifth group by the total area of the martensite blocks included in diffusion layer 11 is more than or equal to 0.7. A value obtained by dividing, by the total area of the martensite blocks included in diffusion layer 11, the total area of the martensite blocks belonging to the fifth group except for a martensite block that has the maximum crystal grain size and that belongs to the fifth group is less than 0.7.

From a different viewpoint, it is said that the martensite blocks included in the fourth group and the martensite blocks belonging to the fifth group are classified by the following method. That is, first, the martensite blocks are assigned to the fourth group sequentially from the one having the smallest crystal grain size, and the total area of the martensite blocks assigned to the fourth group with respect to the total area of the martensite blocks is sequentially calculated. Second, when the ratio of the total area of the martensite blocks assigned to the fourth group with respect to the total area of the martensite blocks reaches a limit of not more than 30%, the assignment of the martensite blocks to the fourth group is stopped. Third, martensite blocks not assigned to the fourth group are assigned to the fifth group.

Preferably, the average grain size of the martensite blocks included in the fifth group is more than or equal to 0.7 μm and less than or equal to 1.1 μm. Preferably, the average aspect ratio of the martensite blocks included in the fifth group is more than or equal to 2.4 and less than or equal to 2.6.

The crystal grain sizes of the martensite blocks in diffusion layer 11 and the aspect ratios of the martensite blocks are measured using an EBSD (Electron Backscattered Diffraction) method.

First, based on the EBSD method, a cross sectional image in diffusion layer 11 is captured (hereinafter, referred to as the "EBSD image"). It should be noted that the EBSD image is captured to include a sufficient number (more than or equal to 20) of the martensite blocks. Based on the EBSD image, a deviation of the crystal orientations of the blocks of the adjacent martensite phases is specified. Accordingly, a boundary of each martensite block is specified. Second, based on the boundary of the specified martensite block, the area and shape of each martensite block in the EBSD image are calculated.

More specifically, by calculating the square root of a value obtained by dividing the area of each martensite block in the EBSD image by $\pi/4$, the equivalent circle diameter of each martensite block in the EBSD image is calculated. The largest value of the equivalent circle diameters of the martensite blocks in the EBSD image is regarded as the maximum grain size of the martensite blocks in diffusion layer 11.

Based on the equivalent circle diameter of each martensite block calculated as described above, the martensite blocks belonging to the first group among the martensite blocks in the EBSD image are determined. The value obtained by dividing, by the total area of the martensite blocks in the EBSD image, the total area of the martensite blocks belonging to the first group among the martensite blocks in the EBSD image is regarded as the value obtained by dividing the total area of the martensite blocks belonging to the first group in diffusion layer 11 by the total area of the martensite blocks in diffusion layer 11.

Based on the equivalent circle diameter of each martensite block calculated as described above, the martensite blocks in the EBSD image are classified into the second group and the third group (or classified into the fourth group and the fifth group). The value obtained by dividing, by the number of the martensite blocks classified into the third group (or the fifth group) in the EBSD image, the total of the equivalent circle diameters of the martensite blocks classified into the third group (or the fifth group) in the EBSD image is regarded as the average grain size of the martensite blocks belonging to the third group (or belonging to the fifth group) in diffusion layer 11.

From the shape of each martensite block in the EBSD image, the shape of each martensite block in the EBSD image is approximated to an ellipse by the least squares method. This approximation to an ellipse by the least squares method is performed in accordance with a method described in S. Biggin and D. J. Dingley, Journal of Applied Crystallography, (1977) 10, 376-378. By dividing the size in the major axis by the size in the minor axis in this elliptical shape, the aspect ratio of each martensite block in the EBSD method image is calculated. A value obtained by dividing the total of the aspect ratios of the martensite blocks classified into the third group (or the fifth group) in the EBSD image by the number of the martensite blocks classified into the third group (or the fifth group) in the EBSD image is regarded as the average aspect ratio of the martensite blocks belonging to the third group (or belonging to the fifth group) in diffusion layer 11.

The plurality of prior austenite grains are included in diffusion layer 11. It should be noted that each of the prior austenite grains is a region defined by a crystal grain boundary (prior austenite grain boundary) of austenite grains formed in a holding step S41 and a holding step S51. The average grain size of the prior austenite grains is preferably less than or equal to 8 μm. The average grain size of the prior austenite grains is more preferably less than or equal to 6 μm.

It should be noted that the average grain size of the prior austenite grains in diffusion layer 11 is measured by the following method. First, a cross section of diffusion layer 11 is polished. Second, the polished surface is corroded. Third, an optical microscope image capturing is performed to the corroded polished surface (in the description below, an image obtained by the optical microscope image capturing will be referred to as "optical microscope image"). It should be noted that the optical microscope image is captured to include a sufficient number (more than or equal to 20) of prior austenite grains. Fourth, image processing is performed to the obtained optical microscope image, thereby calculating the area of each prior austenite grain in the optical microscope image.

By calculating the square root of a value obtained by dividing the area of each prior austenite grain in the optical microscope image by π/4, the equivalent circle diameter of each prior austenite grain in the optical microscope image is calculated. The average grain size of the prior austenite grains in diffusion layer 11 is represented by a value obtained by dividing the total of the equivalent circle diameters of the prior austenite grains in the optical microscope image by the number of the prior austenite grains in the optical microscope image.

An average carbon concentration in diffusion layer 11 between the surface (outer circumferential surface 10b) of inner ring 10 and a position distant away by 10 μm from the surface of inner ring 10 is preferably more than or equal to 0.7 mass %. The average carbon concentration in diffusion layer 11 between the surface (outer circumferential surface 10b) of inner ring 10 and the position distant away by 10 μm from the surface of inner ring 10 is preferably less than or equal to 1.2 mass %.

An average nitrogen concentration in diffusion layer 11 between the surface (outer circumferential surface 10b) of inner ring 10 and the position distant away by 10 μm from the surface of inner ring 10 is preferably more than or equal to 0.2 mass %. The average nitrogen concentration in diffusion layer 11 between the surface (outer circumferential surface 10b) of inner ring 10 and the position distant away by 10 μm from the surface of inner ring 10 is preferably less than or equal to 0.4 mass %.

The average carbon concentration and average nitrogen concentration in diffusion layer 11 between the surface (outer circumferential surface 10b) of inner ring 10 and the position distant away by 10 μm from the surface of inner ring 10 are measured using the EPMA (Electron Probe Micro Analyzer).

(Method for Manufacturing Bearing Part According to Embodiment)

The following describes a method for manufacturing the bearing part according to the embodiment.

Figure 4:
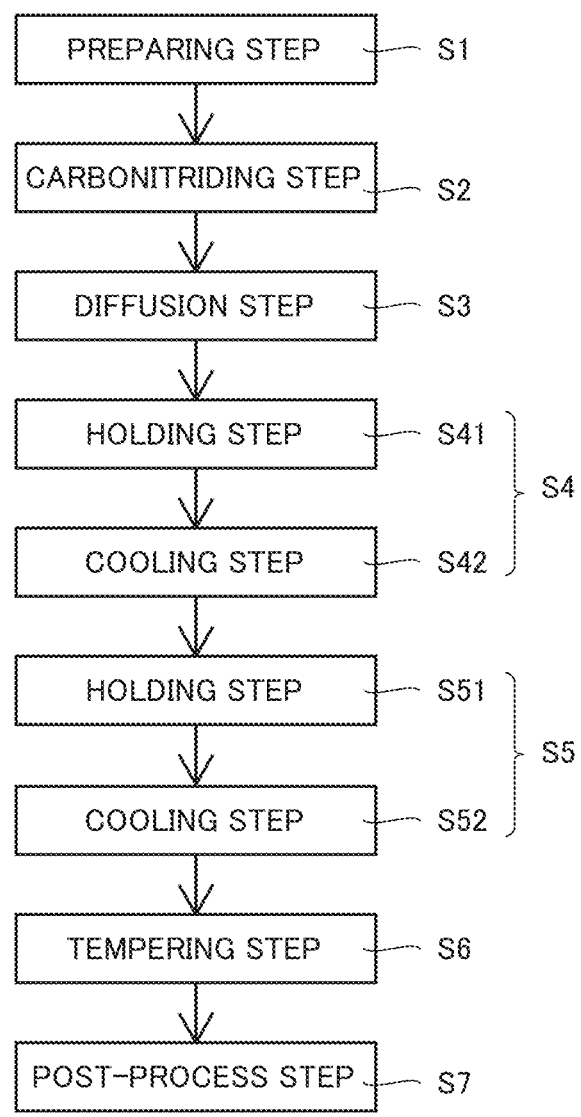
FIG. 4 is a flowchart showing a method for manufacturing the bearing part according to the embodiment.

FIG. 4 is a flowchart showing the method for manufacturing the bearing part according to the embodiment. As shown in FIG. 4, the method for manufacturing the bearing part according to the embodiment includes a preparing step S1, a carbonitriding step S2, a diffusion step S3, a primary quenching step S4, a secondary quenching step S5, a tempering step S6, and a post-process step S7.

In preparing step S1, there is prepared a processing target member to be processed into inner ring 10 through carbonitriding step S2, diffusion step S3, primary quenching step S4, secondary quenching step S5, tempering step S6, and post-process step S7. The processing target member is composed of a chromium molybdenum steel, such as one of SCM steel types defined in JIS.

In carbonitriding step S2, a surface of the processing target member is carbonitrided. Carbonitriding step S2 is performed by holding the processing target member in a furnace at a predetermined temperature (hereinafter, referred to as "first holding temperature") for a predetermined time (hereinafter, referred to as "first holding time"). For the furnace atmosphere, a gas containing an endothermic converted gas (R gas) and ammonia ($NH_3$) is used, for example. The first holding temperature is more than or equal to 930° C. and less than or equal to 940° C., for example. The first holding time is more than or equal to 10 hours and less than or equal to 15 hours, for example.

In diffusion step S3, the carbon and nitrogen introduced via the surface of the processing target member in carbonitriding step S2 are diffused to the inside of the processing target member. Diffusion step S3 is performed by holding the processing target member at a predetermined temperature (hereinafter, referred to as "second holding temperature") for a predetermined time (hereinafter, referred to as "second holding time") in the furnace. For the furnace atmosphere, a gas containing an endothermic converted gas (R gas) and ammonia ($NH_3$) is used, for example. The second holding temperature is more than or equal to 930° C. and less than or equal to 940° C., for example. The second holding time is more than or equal to 5 hours and less than or equal to 10 hours, for example.

In diffusion step S3, a defined by below-described formulas (1) and (2) is adjusted to be lower than that in carbonitriding step S2. As apparent from the formulas (1) and (2), the adjustment of a is performed by adjusting an amount of carbon monoxide, an amount of carbon dioxide, and an amount of undecomposed ammonia in the atmosphere. It should be noted that the amount of the undecomposed ammonia in the atmosphere is preferably more than or equal to 0.1 volume %.

$$a_c^* = \frac{(P_{CO})^2}{K \times P_{CO_2}} \quad (1)$$

$P_{CO}$: Partial Pressure of Carbon Monoxide (atm) $P_{CO_2}$: Partial Pressure of Carbon Dioxide (atm)
K:<C>+$CO_2$⇔Equilibrium Constant of 2CO $$\alpha = \frac{P_{NH_3}}{0.006 \times (P_H)^{\frac{3}{2}}} \times \frac{(1.877 - 1.055 \times a_C^*)}{100} \qquad (2)$$

In primary quenching step S4, the processing target member is quenched. Primary quenching step S4 includes a holding step S41 and a cooling step S42. Holding step S41 is performed by holding the processing target member in the furnace at a predetermined temperature (hereinafter, referred to as "third holding temperature") for a predetermined time (hereinafter, referred to as "second holding time"). It should be noted that in primary quenching step S4, no ammonia is included in the atmosphere of the furnace. The third holding temperature is a temperature of more than or equal to the $A_1$ transformation point of the steel and less than the first holding temperature and the second holding temperature. The third holding temperature is more than or equal to 850° C. and less than 930° C., for example. Preferably, the third holding temperature is more than or equal to 860° C. and less than or equal to 880° C. The third holding time is more than or equal to 0.5 hour and less than or equal to 2 hours, for example. In cooling step S42, the processing target member is cooled. Cooling step S42 is performed by oil cooling, for example.

In secondary quenching step S5, the processing target member is quenched. Secondary quenching step S5 includes a holding step S51 and a cooling step S52. Holding step S51 is performed by holding the processing target member in a furnace at a predetermined temperature (hereinafter, referred to as "fourth holding temperature") for a predetermined time (hereinafter, referred to as "fourth holding time"). It should be noted that in secondary quenching step S5, no ammonia is included in the atmosphere in the furnace. The fourth holding temperature is a temperature of more than or equal to the $A_1$ transformation point of the steel of the processing target member and less than the third holding temperature. The fourth holding temperature is more than or equal to the $A_1$ transformation point of the steel of the processing target member, and is less than or equal to 850° C., for example. The fourth holding temperature is preferably more than or equal to 820° C. and less than or equal to 840° C. The fourth holding time is more than or equal to 1 hour and less than or equal to 2 hours, for example. In cooling step S52, the processing target member is cooled. Cooling step S52 is performed by oil cooling, for example.

The compound grains in diffusion layer 11 are precipitated mainly in holding step S41 and holding step S51. The limit of solid solution of each of carbon and nitrogen in the steel is increased as the holding temperature becomes higher (the limit of solid solution of each of carbon and nitrogen in the steel is decreased as the holding temperature becomes lower). In order to avoid the compound grains from being precipitated to be too large in diffusion layer 11 in holding step S41, the third holding temperature is set to be higher than the holding temperature in general quenching (the third holding temperature is set to relatively increase the limit of solid solution of each of carbon and nitrogen in the steel as compared with that in the general quenching).

In holding step S51, the compound grains have been already precipitated in holding step S41. That is, in holding step S51, the carbon concentration and nitrogen concentration in the base material have been decreased, and the compound grains are less likely to be precipitated than in holding step S41. Hence, in order to promote precipitation of the compound grains in holding step S51 by decreasing the limit of solid solution of each of nitrogen and carbon in the steel, the fourth holding temperature is set to be lower than the third holding temperature. Accordingly, the area ratio of the compound grains in diffusion layer 11 can be more than or equal to 3%. Moreover, by setting the fourth holding temperature to be lower than the third holding temperature, the compound grains precipitated in holding step S41 and holding step S51 can be suppressed from being coarse, whereby the average grain size of the compound grains in diffusion layer 11 can be less than or equal to 0.3 μm.

In each of holding step S41 and holding step S51, through a pinning effect of the large amount of the fine compound grains precipitated as described above, growth of the austenite crystal grains is suppressed, whereby the austenite crystal grains are kept to be fine. Regarding the martensite transformation, a plurality of martensite blocks are formed in one austenite crystal grain. From another viewpoint, it is said that one martensite block is not formed across a plurality of austenite crystal grains. Accordingly, as an austenite crystal grain becomes finer, a martensite block included therein also becomes finer.

In tempering step S6, the processing target member is tempered. Tempering step S6 is performed by performing cooling after holding the processing target member in a furnace at a predetermined temperature (hereinafter, referred to as "fifth holding temperature") for a predetermined time (hereinafter, referred to as "fifth holding time"). The fifth holding temperature is a temperature of less than or equal to the $A_1$ transformation point of the steel of the processing target member. The fifth holding temperature is more than or equal to 150° C. and less than or equal to 350° C., for example. The fourth holding time is 0.5 hour to 5 hours, for example. The cooling in tempering step S6 is performed by air cooling, for example.

Figure 5:
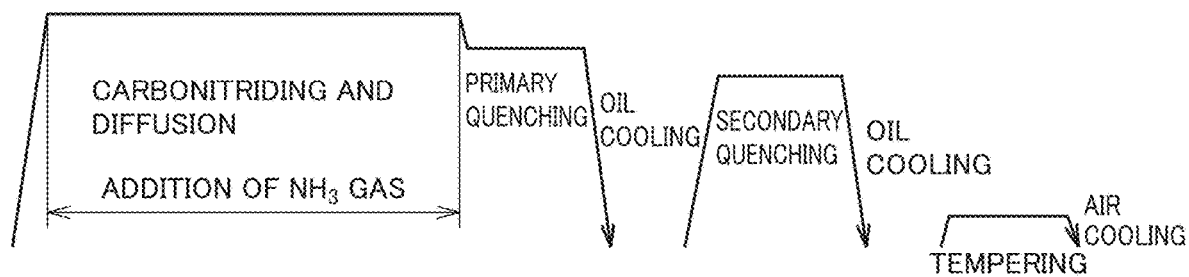
FIG. 5 is a graph showing a heat pattern in the method for manufacturing the bearing part according to the embodiment.

FIG. 5 is a graph showing a heat pattern in the method for manufacturing the bearing part according to the embodiment. FIG. 5 schematically shows a relation among the first holding temperature to the fifth holding temperature and the first holding time to the fifth holding time.

In post-process step S7, the processing target member is post-processed. In post-process step S7, cleaning of the processing target member, machining of the processing target member, such as grinding or polishing, and the like are performed, for example. In the manner described above, the bearing part according to the embodiment is manufactured.

(Configuration of Rolling Bearing According to Embodiment)

The following describes a configuration of a rolling bearing 100 according to the embodiment.

Figure 6:
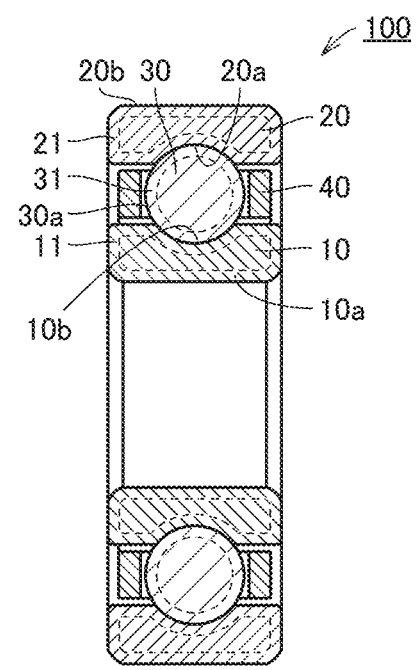
FIG. 6 is a cross sectional view of a rolling bearing 100 according to the embodiment.

FIG. 6 is a cross sectional view of rolling bearing 100 according to the embodiment. As shown in FIG. 6, rolling bearing 100 is a deep groove ball bearing, for example. However, rolling bearing 100 according to the embodiment is not limited to this. Rolling bearing 100 according to the embodiment may be a tapered roller bearing, for example. Rolling bearing 100 according to the embodiment has inner ring 10, an outer ring 20, rolling elements 30, and a cage 40. The configuration of inner ring 10 is as described above. It should be noted that a raceway surface at outer circumferential surface 10b of inner ring 10 is referred to as "first raceway surface".

Outer ring 20 is composed of a chromium molybdenum steel. A SCM steel type defined in JIS is used for outer ring 20, for example. The chromium molybdenum steel used for outer ring 20 is SCM435 defined in JIS, for example. Outer ring 20 has an inner circumferential surface 20a and an outer circumferential surface 20b. Inner circumferential surface 20a constitutes a raceway surface (second raceway surface) of outer ring 20. Inner ring 10 and outer ring 20 are disposed such that outer circumferential surface 10b and inner circumferential surface 20a face each other. A diffusion layer 21 is provided in the surface (inner circumferential surface 20a) of outer ring 20. Diffusion layer 21 has the same configuration as that of diffusion layer 11.

Each of rolling elements 30 is composed of a chromium molybdenum steel. A SCM steel type defined in JIS is used for rolling element 30, for example. The chromium molybdenum steel used for rolling element 30 is SCM435 defined in JIS, for example. Rolling element 30 is disposed to be rollable between outer circumferential surface 10b and inner circumferential surface 20a. Rolling element 30 has a spherical shape.

Rolling element 30 has a surface 30a. Surface 30a constitutes a rolling contact surface of rolling element 30. A diffusion layer 31 is provided in surface 30a of rolling element 30. Diffusion layer 31 has the same configuration as that of diffusion layer 11.

It should be noted that the diffusion layer does not need to be provided in each of outer circumferential surface 10b, inner circumferential surface 20a, and surface 30a. The diffusion layer may be provided in at least one of outer circumferential surface 10b, inner circumferential surface 20a, and surface 30a.

Cage 40 is composed of a resin material, for example. Cage 40 has a ring-like shape. Cage 40 is disposed between inner ring 10 and outer ring 20. Cage 40 is provided with a plurality of through holes. The through holes extend through cage 40 in a direction from the inner circumferential surface toward the outer circumferential surface. The through holes are disposed at an equal interval in the circumferential direction of cage 40. Rolling elements 30 are disposed in the through holes. Accordingly, a space between adjacent rolling elements 30 in the circumferential direction is maintained.
(Effects of Bearing Part According to Embodiment and Rolling Bearing According to Embodiment)

The following describes effects of the bearing part according to the embodiment and rolling bearing 100 according to the embodiment.

The bearing part according to the embodiment is composed of a chromium molybdenum steel. Accordingly, in the bearing part according to the embodiment, the content of an alloy element is relatively low, thereby suppressing increase in cost of the steel material and increase in process cost.

Since the average grain size of the compound grains in diffusion layer 11 is less than or equal to 0.3 μm and the area ratio of the compound grains in diffusion layer 11 is more than or equal to 3%, the large amount of the relatively fine compound grains are dispersed in diffusion layer 11. Accordingly, due to the pinning effect of the compound grains, the prior austenite grains in diffusion layer 11 become fine, with the result that the martensite blocks in diffusion layer 11 also become fine. As a larger amount of the fine compound grains each having a relatively high hardness are dispersed and as the crystal grain sizes of the martensite blocks becomes finer, the hardness and toughness of diffusion layer 11 are more improved. Therefore, according to the bearing part according to the embodiment, the wear resistance and toughness of the bearing part can be secured while suppressing increase in cost of the steel material and increase in process cost, which would have otherwise resulted from the increased content of the alloy element.

When the value obtained by dividing the total area of the martensite block belonging to the first group by the total area of the martensite blocks is more than or equal to 0.55 and less than or equal to 0.75 in diffusion layer 11, the ratio of the fine martensite blocks each having a crystal grain size of less than or equal to 1.0 μm in diffusion layer 11 becomes relatively high. Accordingly, in this case, the wear resistance and toughness of the bearing part can be further improved.

When the average grain size of the martensite blocks belonging to the third group is more than or equal to 0.7 μm and less than or equal to 1.4 μm in diffusion layer 11, the ratio of the fine martensite blocks in diffusion layer 11 becomes relatively high. Accordingly, in this case, the wear resistance and toughness of the bearing part can be further improved. As each martensite block has a smaller aspect ratio (as the aspect ratio is closer to 1), the martensite block is less likely to be a source of stress concentration. Accordingly, when the average aspect ratio of the martensite blocks belonging to the third group in diffusion layer 11 is more than or equal to 2.5 and less than or equal to 2.8, the toughness of the bearing part can be further improved.

When the average grain size of the martensite blocks belonging to the fifth group is more than or equal to 0.6 μm and less than or equal to 1.1 μm in diffusion layer 11, the ratio of the fine martensite blocks in diffusion layer 11 becomes relatively high. Accordingly, in this case, the wear resistance and toughness of the bearing part can be further improved. When the average aspect ratio of the martensite blocks belonging to the fifth group in diffusion layer 11 is more than or equal to 2.4 and less than or equal to 2.6, the toughness of the bearing part can be further improved.

A plurality of martensite blocks are generated from one austenite grain, and one martensite block is not formed across a plurality of austenite grains. Accordingly, as the crystal grain size of the prior austenite grain becomes smaller, the crystal grain size of the martensite block formed in the grain becomes smaller. Therefore, when the average grain size of the prior austenite grains in diffusion layer 11 is less than or equal to 8 μm, the grain sizes of the martensite blocks in diffusion layer 11 can be finer, whereby the wear resistance and toughness of the bearing part can be further improved.

In rolling bearing 100 according to the embodiment, at least one of outer circumferential surface 10b, inner circumferential surface 20a, and surface 30a is provided with a diffusion layer having the same configuration as that of diffusion layer 11. Therefore, according to rolling bearing 100 according to the embodiment, the wear resistance and toughness of the rolling bearing can be secured while suppressing increase in cost of the steel material and increase in process cost, which would have otherwise resulted from the increased content of the alloy element.

Examples

The following describes an experiment (hereinafter, referred to as "the present experiment") performed to confirm the effects of the bearing part according to the embodiment and rolling bearing 100 according to the embodiment.
<Samples>

A sample 1 to a sample 4 were used in the present experiment. A steel used for each of sample 1 to sample 4 is SCM435 as shown in Table 1. Each of sample 1 and sample 3 is an inner ring of a tapered roller bearing, whereas each of sample 2 and sample 4 is a tapered roller of a tapered roller bearing.

TABLE 1

| C (w %) | Si (wt %) | Mn (wt %) | P (wt %) | S (wt %) | Ni (wt %) | Cr (wt %) | Mo (wt %) | Fe (wt %) |
|---|---|---|---|---|---|---|---|---|
| 0.33 to 0.38 | 0.15 to 0.35 | 0.60 to 0.90 | Less Than or Equal to 0.030 | Less Than or Equal to 0.030 | Less Than or Equal to 0.25 | 0.90 to 1.20 | 0.15 to 0.30 | Remainder |

As shown in Table 2, each of sample 1 to sample 4 was subjected to carbonitriding step S2 under conditions that the first holding temperature was more than or equal to 930° C. and less than or equal to 940° C. and the first holding time was 13 hours. Each of sample 1 to sample 4 was subjected to diffusion step S3 under conditions that the second holding temperature was more than or equal to 930° C. and less than or equal to 940° C. and the second holding time was 6 hours. It should be noted that an amount of carbon monoxide, an amount of carbon dioxide, and an amount of ammonia in the atmosphere in each of carbonitriding step S2 and diffusion step S3 were respectively more than or equal to 11 volume % and less than or equal to 17 volume %, more than or equal to 0.05 volume % and less than or equal to 0.15 volume %, and more than or equal to 0.1 volume % and less than or equal to 0.3 volume %.

Each of sample 1 to sample 4 was subjected to primary quenching step S4 under conditions that the third holding temperature was 870° C. and the third holding time was 1 hour. Each of sample 1 and sample 2 was subjected to secondary quenching step S5 under conditions that the fourth holding temperature was 830° C. and the fourth holding temperature was 1.5 hours. Moreover, each of sample 1 to sample 4 was subjected to tempering step S6 under conditions that the fifth holding temperature was 180° C. and the fifth holding time was 3 hours. Each of sample 1 to sample 4 was subjected to mechanical polishing with a polishing amount of 150 μm as post-process step S7.

TABLE 2

| | Samples 1 and 2 | Samples 3 and 4 |
|---|---|---|
| First Holding Temperature (° C.) | 930 to 940 | 930 to 940 |
| First Holding Time (h) | 13 | 13 |
| Second Holding Temperature (° C.) | 930 to 940 | 930 to 940 |
| Second Holding Time (h) | 6 | 6 |
| Third Holding Temperature (° C.) | 870 | 870 |
| Third Holding Time (h) | 1 | 1 |
| Fourth Holding Temperature (° C.) | 830 | — |
| Fourth Holding Time (h) | 1.5 | — |
| Fifth Holding Temperature (° C.) | 180 | 180 |
| Fifth Holding Time (h) | 3 | 3 |

<Measurement of Carbon Concentration and Nitrogen Concentration>

Figure 7:
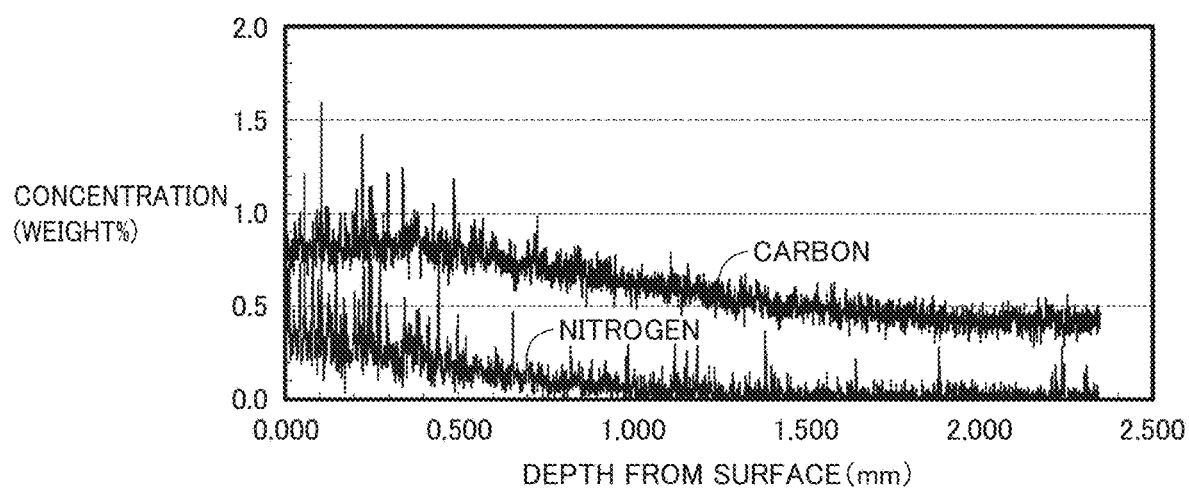
FIG. 7 is a graph showing a result of measurement of each of a carbon concentration and a nitrogen concentration by EPMA in a sample 1.
Figure 8:
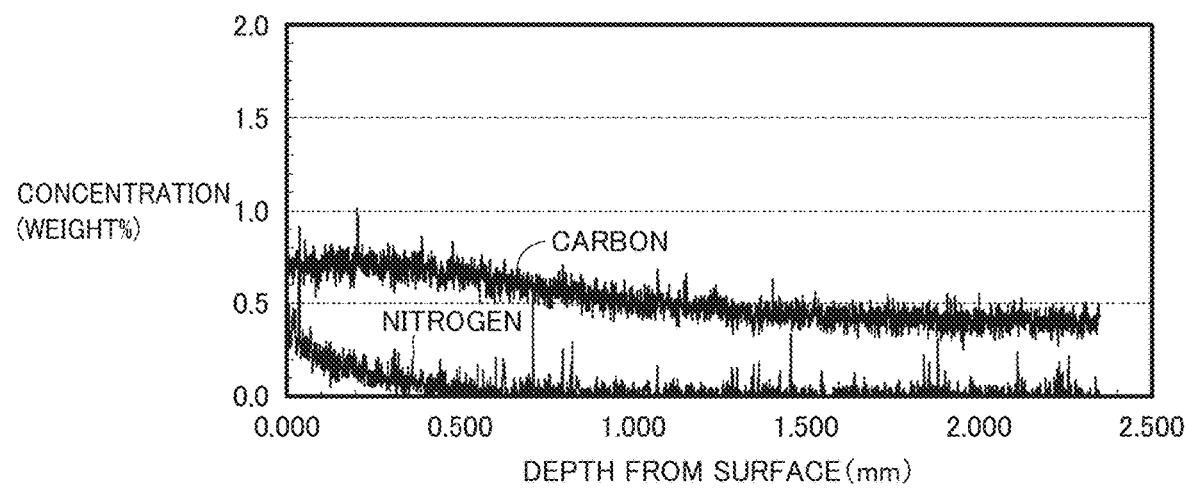
FIG. 8 is a graph showing a result of measurement of each of a carbon concentration and a nitrogen concentration by EPMA in a sample 3.

FIG. 7 is a graph showing a result of measurement of carbon concentration and nitrogen concentration by EPMA in sample 1. FIG. 8 is a graph showing a result of measurement of carbon concentration and nitrogen concentration by EPMA in sample 3. It should be noted that in each of FIG. 7 and FIG. 8, the horizontal axis represents a distance (unit: mm) from the surface of each of sample 1 and sample 3, whereas the vertical axis represents the carbon concentration and the nitrogen concentration (unit: mass % concentration).

As shown in FIG. 7, in the vicinity of the surface of sample 1, a multiplicity of sharp peaks were confirmed in the carbon concentration and the nitrogen concentration. From this result, it was experimentally confirmed that fine compound grains, such as a carbide, a nitride, and a carbonitride, were precipitated in the vicinity of the surface in sample 1. Moreover, in sample 1, the average carbon concentration in the region between the surface and the position distant away by 10 μm from the surface fell within a range of more than or equal to 0.7% and less than or equal to 1.2%, and the average nitrogen concentration in this region fell within a range of more than or equal to 0.2 mass % and less than or equal to 0.4 mass %. On the other hand, as shown in FIG. 8, in the vicinity of the surface of sample 2, a multiplicity of sharp peaks were not confirmed in the carbon concentration and the nitrogen concentration. From this result, it was experimentally confirmed that no fine compound grains, such as a carbide, a nitride, and a carbonitride, were precipitated in the vicinity of the surface in sample 3.

<Structure Observation>

Figure 9:
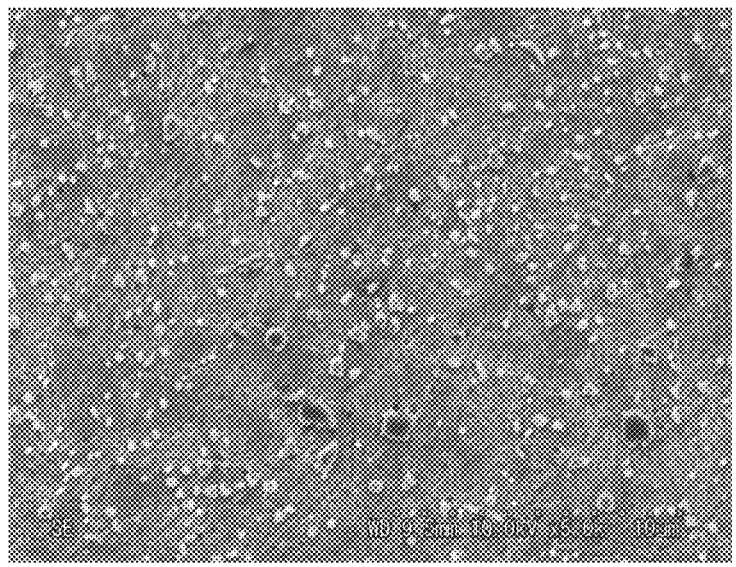
FIG. 9 is an electron microscope image of a vicinity of a surface of sample 1.
Figure 10:
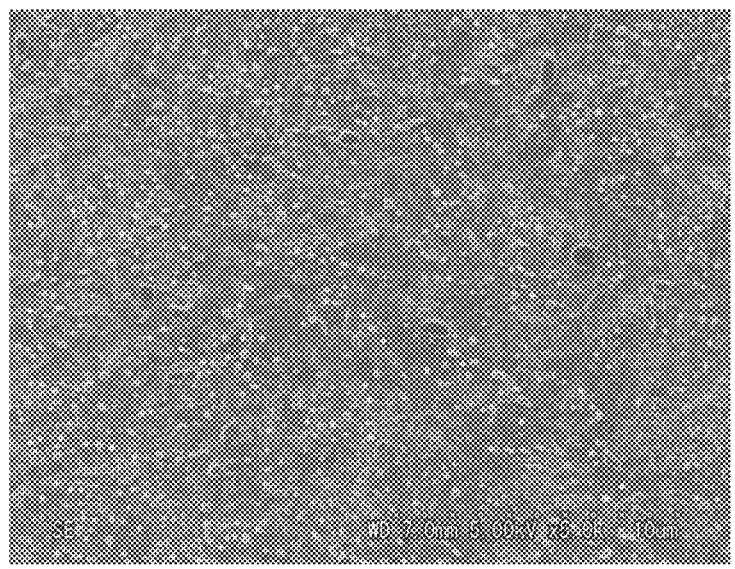
FIG. 10 is an electron microscope image of a vicinity of a surface of a sample 2.

FIG. 9 is an electron microscope image of the vicinity of the surface of sample 1. FIG. 10 is an electron microscope image of the vicinity of the surface of sample 2. As shown in FIG. 9 and FIG. 10, in the vicinity of the surfaces of sample 1 and sample 2, it was confirmed that a multiplicity of compound grains of more than or equal to 0.2 μm and less than or equal to 3.0 μm were precipitated. Moreover, in the vicinity of the surface of each of sample 1 and sample 2, it was confirmed that the average grain size of the compound grains was about 0.25 μm. Further, in the vicinity of the surface of each of sample 1 and sample 2, it was confirmed that the area ratio of the compound grains was about 8%.

Figure 11:
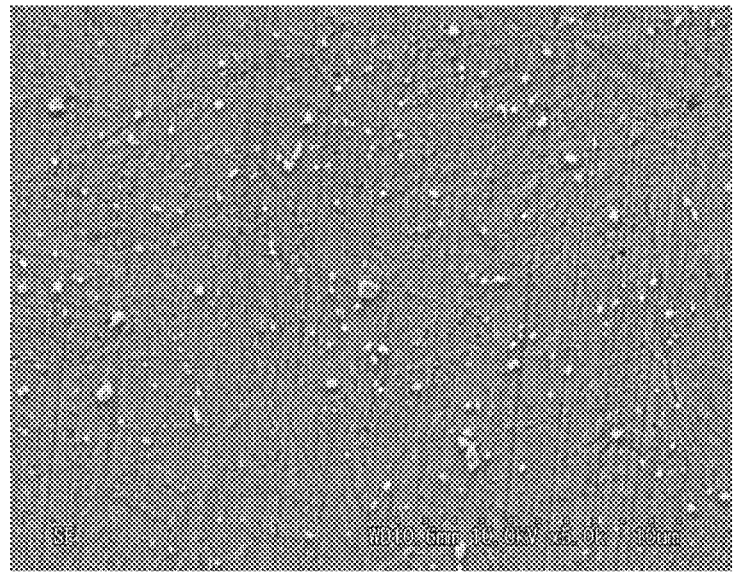
FIG. 11 is an electron microscope image of a vicinity of a surface of sample 3.
Figure 12:
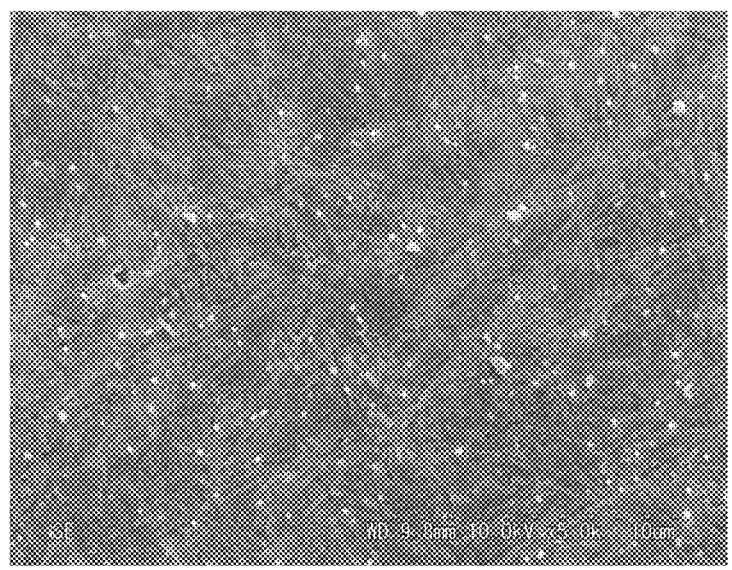
FIG. 12 is an electron microscope image of a vicinity of a surface of a sample 4.

FIG. 11 is an electron microscope image of the vicinity of the surface of sample 3. FIG. 12 is an electron microscope image of the vicinity of the surface of sample 4. As shown in FIG. 11 and FIG. 12, in the vicinity of the surface of each of sample 3 and sample 4, it was confirmed that the area ratio of the compound grains was about 1%.

Figure 13:
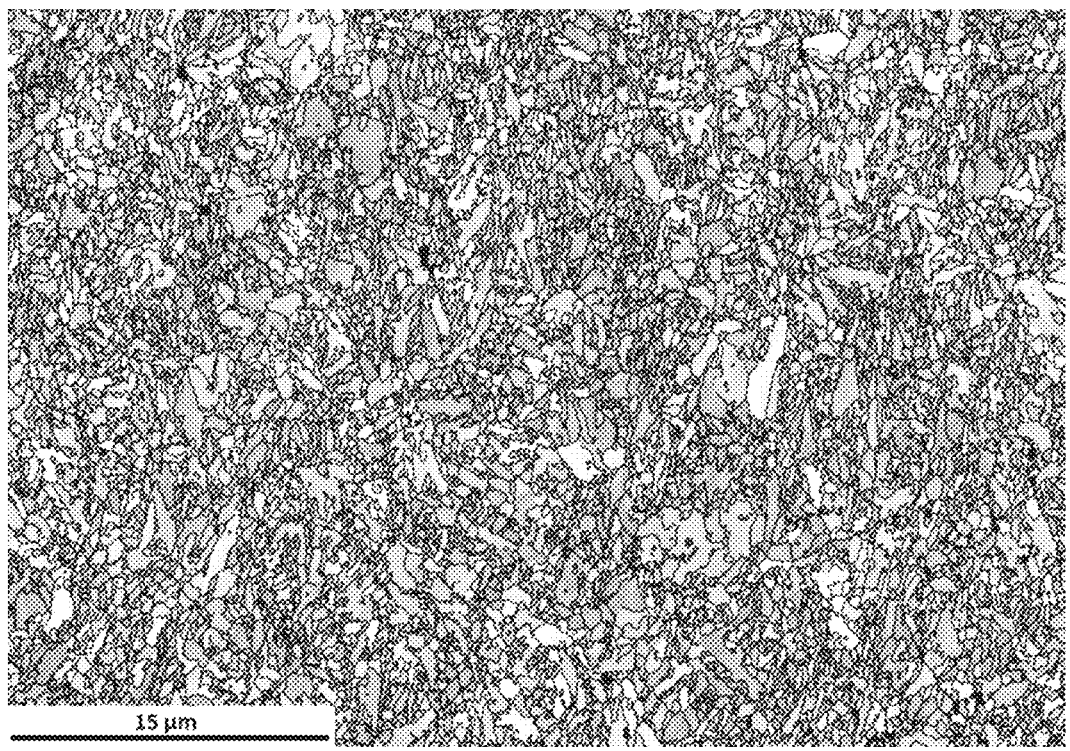
FIG. 13 is an EBSD image of the vicinity of the surface of sample 2.

FIG. 13 is an EBSD image of the vicinity of the surface of sample 2. As shown in FIG. 13, in the vicinity of the surface of sample 2, it was confirmed that the maximum grain size of the martensite blocks fell within the range of more than or equal to 3.6 μm and less than or equal to 3.8 μm. Moreover, in the vicinity of the surface of sample 2, it was confirmed that martensite blocks each having a crystal grain size of less than or equal to 2 μm occupied more than or equal to 90% of the area of the martensite blocks. Further, in the vicinity of the surface of sample 2, it was confirmed that martensite blocks each having a crystal grain size of less than or equal to 1 μm occupied more than or equal to 55% and less than or equal to 75% of the area of the martensite blocks.

Figure 14:
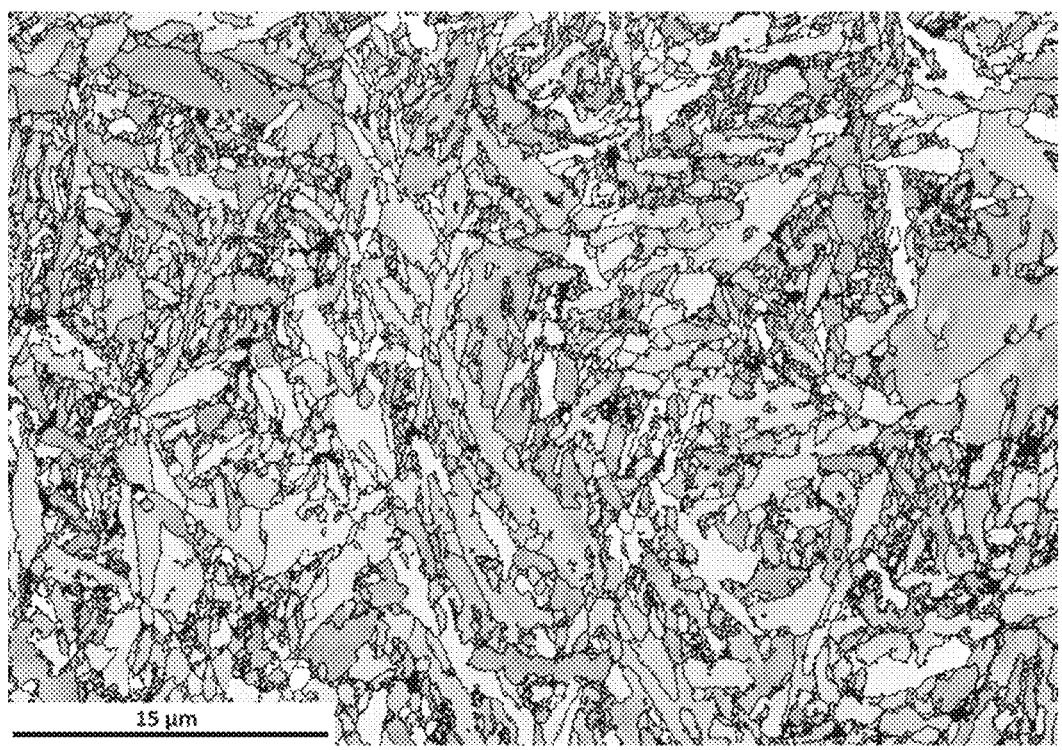
FIG. 14 is an EBSD image of the vicinity of the surface of a sample 4.

FIG. 14 is an EBSD image of the vicinity of the surface of sample 4. As shown in FIG. 14, in the vicinity of the surface of sample 4, it was confirmed that the maximum grain size of the martensite blocks fell within the range of more than or equal to 5.1 μm and less than or equal to 7.3 μm. Moreover, in the vicinity of the surface of sample 4, it was confirmed that martensite blocks each having a crystal grain size of less than or equal to 2 μm occupied more than or equal to 65% and less than or equal to 80% of the area of the martensite blocks. Further, in the vicinity of the surface of sample 4, it was confirmed that martensite blocks each having a crystal grain size of less than or equal to 1 µm occupied more than or equal to 35% and less than or equal to 45% of the area of the martensite blocks.

Figure 15:
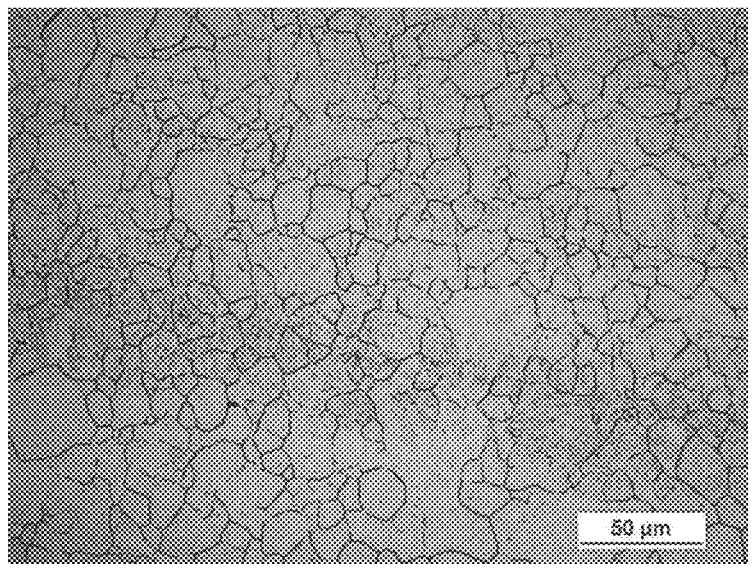
FIG. 15 is an optical microscope image of the vicinity of the surface of sample 1.
Figure 16:
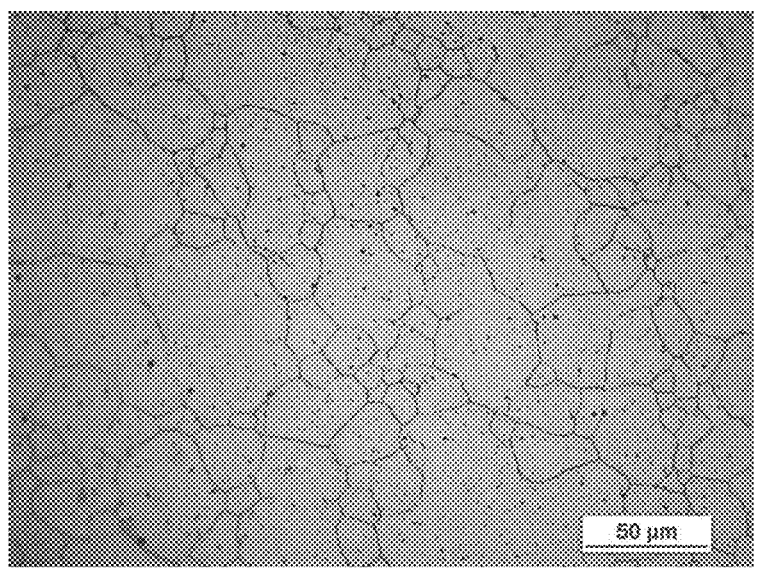
FIG. 16 is an optical microscope image of the vicinity of the surface of sample 3.

FIG. 15 is an optical microscope image of the vicinity of the surface of sample 1. As shown in FIG. 15, in the vicinity of the surface of sample 1, it was confirmed that the average grain size of the prior austenite grains fell within a range of more than or equal to 4 µm and less than or equal to 8 µm, and the crystal grain sizes of the prior austenite grains were distributed in the range of more than or equal to 1 µm and less than or equal to 10 µm. FIG. 16 is an optical microscope image of the vicinity of the surface of sample 3. As shown in FIG. 16, in the vicinity of the surface of sample 3, it was confirmed that the average grain size of the prior austenite grains fell within a range of more than or equal to 12 µm and less than or equal to 25 µm, and the crystal grain sizes of the prior austenite grains were distributed in a wide range of more than or equal to 5 µm and less than or equal to 100 µm.

Figure 17:
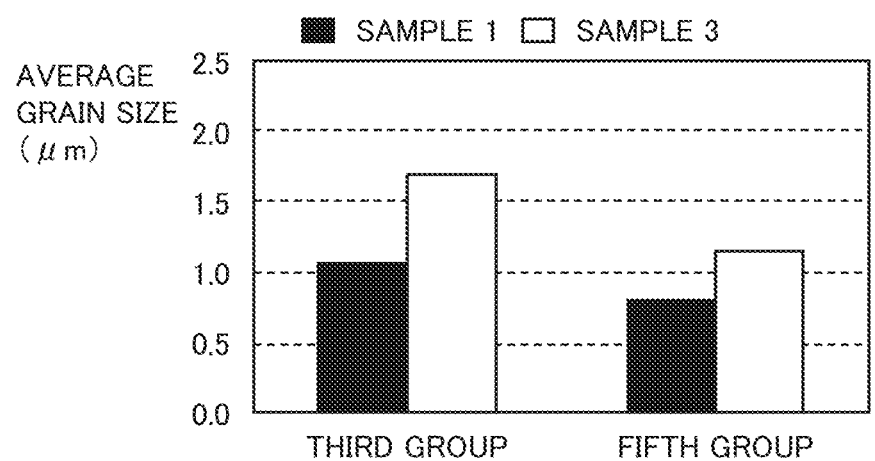
FIG. 17 is a graph showing average grain sizes of martensite blocks belonging to a third group and a fifth group in the vicinity of the surface of each of sample 1 and sample 3.
Figure 18:
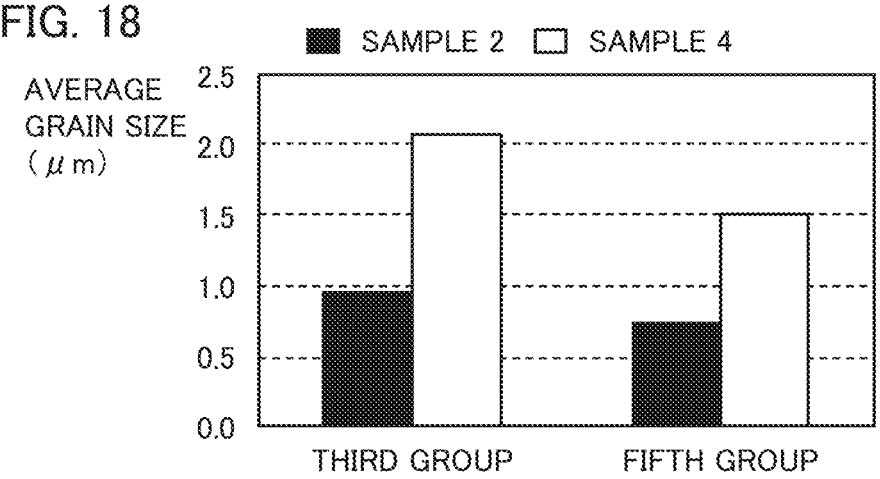
FIG. 18 is a graph showing average grain sizes of martensite blocks belonging to a third group and a fifth group in the vicinity of the surface of each of sample 2 and sample 4.

FIG. 17 is a graph showing an average grain size of martensite blocks belonging to each of the third group and the fifth group in the vicinity of the surface of each of sample 1 and sample 3. It should be noted that in FIG. 17, the vertical axis represents the average grain size (unit: µm). FIG. 18 is a graph showing an average grain size of martensite blocks belonging to each of the third group and the fifth group in the vicinity of the surface of each of sample 2 and sample 4. It should be noted that in FIG. 18, the vertical axis represents the average grain size (unit: µm).

As shown in FIG. 17, in the vicinity of the surface of sample 1, the average grain size of the martensite blocks belonging to the third group was about 1.0 µm. As shown in FIG. 18, in the vicinity of the surface of sample 2, the average grain size of the martensite blocks belonging to the third group was about 0.9 µm. From this, in each of sample 1 and sample 2, it was confirmed that the average grain size of the martensite blocks belonging to the third group fell within a range of more than or equal to 0.7 µm and less than or equal to 1.4 µm.

As shown in FIG. 17, in the vicinity of the surface of sample 1, the average grain size of the martensite blocks belonging to the fifth group was about 0.8 µm. As shown in FIG. 18, in the vicinity of the surface of sample 2, the average grain size of the martensite blocks belonging to the fifth group was about 0.7 µm. From this, in each of sample 1 and sample 2, it was confirmed that the average grain size of the martensite blocks belonging to the fifth group fell within a range of more than or equal to 0.6 µm and less than or equal to 1.1 µm.

On the other hand, in the vicinities of the surfaces of sample 3 and sample 4, the average grain sizes of the martensite blocks belonging to the third group were respectively about 1.7 µm and about 2.2 µm. Moreover, in the vicinities of the surfaces of sample 3 and sample 4, the average grain sizes of the martensite blocks belonging to the fifth group were respectively about 1.3 µm and about 1.5 µm.

Figure 19:
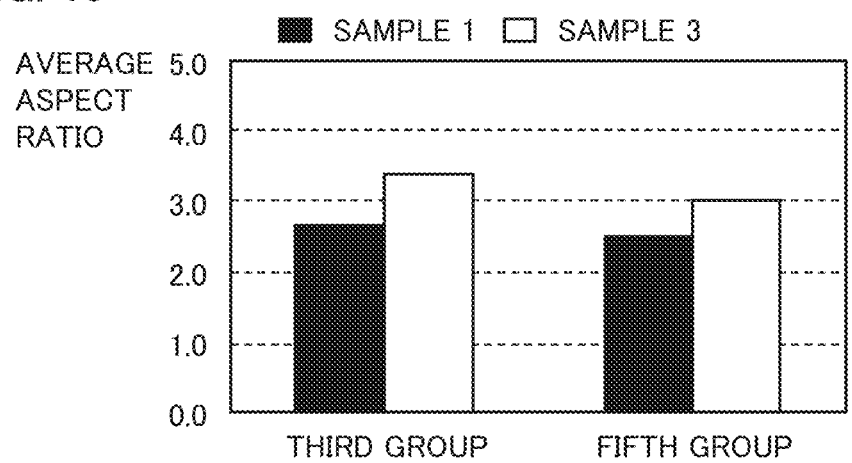
FIG. 19 is a graph showing average aspect ratios of the martensite blocks belonging to the third group and the fifth group in the vicinity of the surface of each of sample 1 and sample 3.
Figure 20:
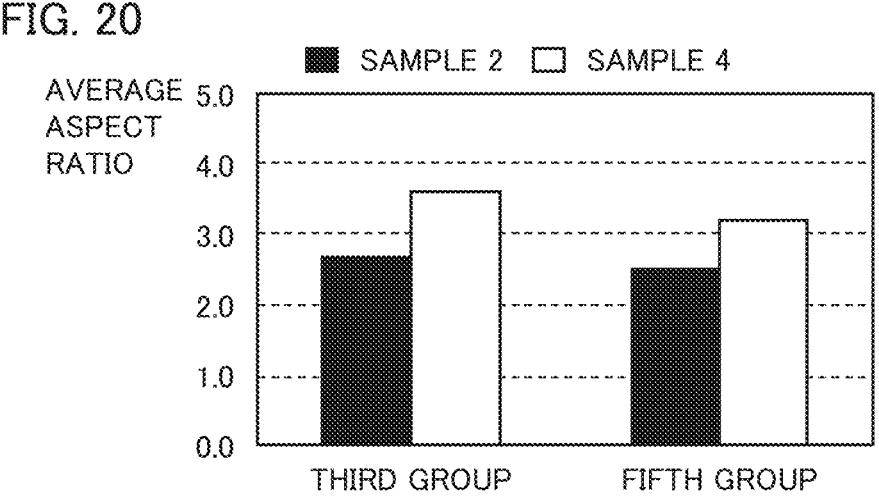
FIG. 20 is a graph showing average aspect ratios of the martensite blocks belonging to the third group and the fifth group in the vicinity of the surface of each of sample 2 and sample 4.

FIG. 19 is a graph showing an average aspect ratio of martensite blocks belonging to the third group and the fifth group in the vicinity of the surface of each of sample 1 and sample 3. It should be noted that in FIG. 19, the vertical axis represents the average aspect ratio. FIG. 20 is a graph showing an average aspect ratio of martensite blocks belonging to the third group and the fifth group in the vicinity of the surface of each of sample 2 and sample 4. It should be noted that in FIG. 20, the vertical axis represents the aspect ratio.

As shown in FIG. 19, in the vicinity of the surface of sample 1, the average aspect ratio of the martensite blocks belonging to the third group was about 2.8. As shown in FIG. 20, in the vicinity of the surface of sample 2, the average aspect ratio of the martensite blocks belonging to the third group was about 2.8. From this, it was confirmed that in each of sample 1 and sample 2, the average aspect ratio of the martensite blocks belonging to the third group fell within a range of more than or equal to 2.5 and less than or equal to 2.8.

As shown in FIG. 19, in the vicinity of the surface of sample 1, the average aspect ratio of the martensite blocks belonging to the fifth group was about 2.6. As shown in FIG. 20, in the vicinity of the surface of sample 2, the average aspect ratio of the martensite blocks belonging to the fifth group was about 2.6. From this, in each of sample 1 and sample 2, it was confirmed that the average aspect ratio of the martensite blocks belonging to the fifth group fell within a range of more than or equal to 2.4 and less than or equal to 2.6.

On the other hand, in the vicinities of the surfaces of sample 3 and sample 4, the average aspect ratios of the martensite blocks belonging to the third group were respectively about 3.2 and about 3.5. Moreover, in the vicinities of the surfaces of sample 3 and sample 4, the average aspect ratios of the martensite blocks belonging to the fifth group were respectively about 3.0 and about 3.1.

<Charpy Impact Test>

A Charpy impact test was performed to the following samples: a sample 5 prepared in accordance with the same method as that for each of sample 1 and sample 2 described above; and a sample 6 prepared in accordance with the same method as that for each of sample 3 and sample 4 described above. The Charpy impact test was performed according to JIS (JIS Z 2242: 2005). In each of sample 5 and sample 6, a U-notch was formed to have a notch depth of 2 mm and a notch bottom curvature radius of 1 mm.

Figure 21:
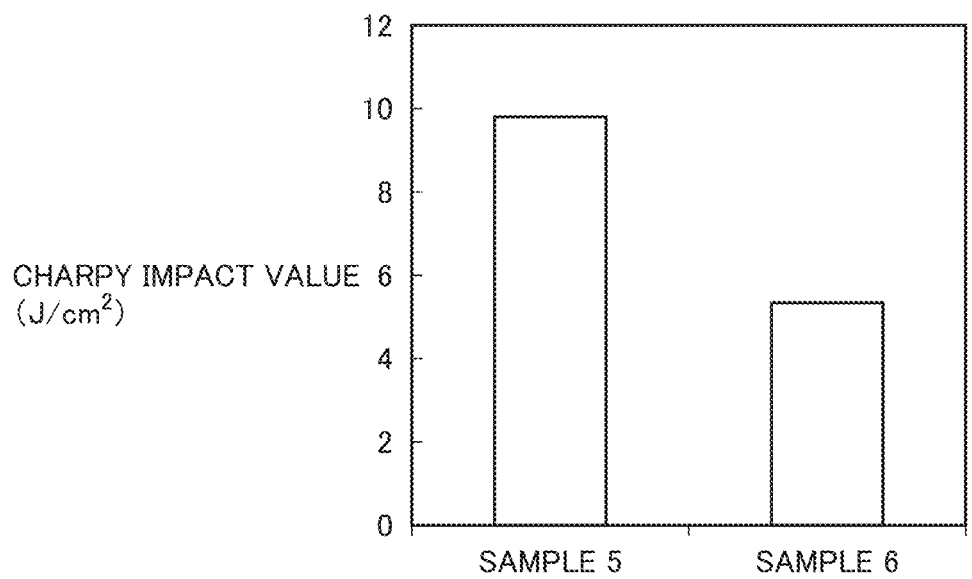
FIG. 21 is a graph showing a result of a Charpy impact test on each of a sample 5 and a sample 6.

FIG. 21 is a graph showing a result of the Charpy impact test on each of sample 5 and sample 6. It should be noted that in FIG. 21, the vertical axis represents a Charpy impact value (unit: $J/cm^2$). As shown in FIG. 21, it was confirmed that the Charpy impact value of sample 5 was 1.5 times or more as large as the Charpy impact value of sample 6.

Figure 22:
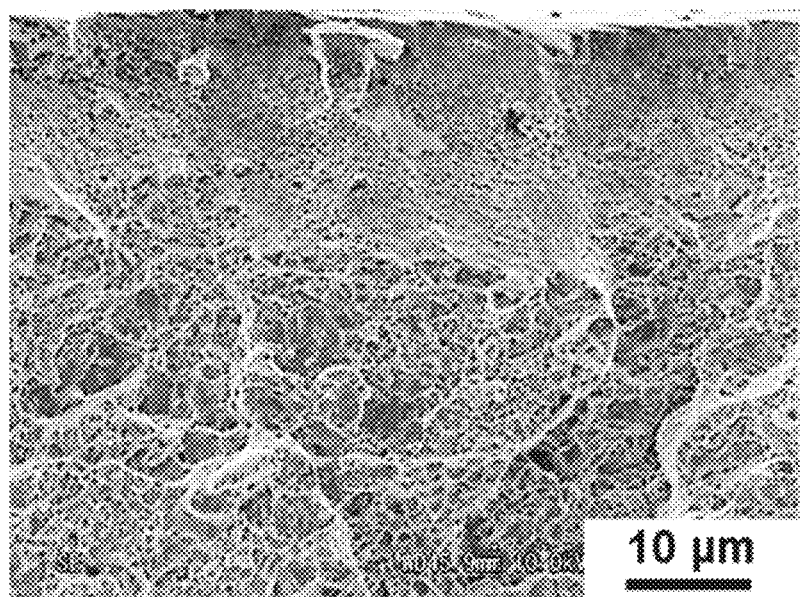
FIG. 22 is an electron microscope image of the notch-side surface of sample 5 after the Charpy impact test is performed.
Figure 23:
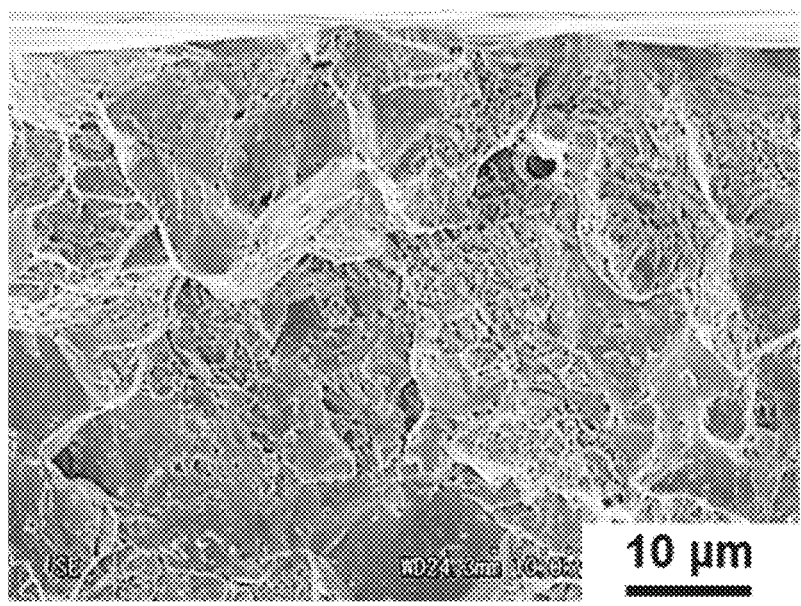
FIG. 23 is an electron microscope image of the notch-side surface of sample 6 after the Charpy impact test is performed.

FIG. 22 shows an electron microscope image in the notch-side surface of sample 5 after the Charpy impact test. FIG. 23 shows an electron microscope image in the notch-side surface of sample 6 after the Charpy impact test. It should be noted that in each of FIG. 22 and FIG. 23, the upper side corresponds to the notch side. As shown in FIG. 22, in the fractured surface after the Charpy impact test on sample 5, a multiplicity of dimples, which indicates occurrence of ductile fracture, were observed. On the other hand, as shown in FIG. 23, in the fractured surface after the Charpy impact test on sample 6, it was confirmed that such dimples were decreased and a fractured surface resulting from brittle fracture was exhibited.

<Rolling Fatigue Life Test under Lubricating Condition with Foreign Matter Introduced>

Each of sample 7 and sample 8 was subjected to a rolling fatigue test under a lubricating condition with a foreign matter introduced (hereinafter, referred to as "rolling fatigue test"). Each of sample 7 and sample 8 is a tapered roller bearing of JIS 30206.

Each of the inner ring, outer ring, and tapered roller used in sample 7 was prepared by the same method as that for each of sample 1 and sample 2 described above. Each of the inner ring, outer ring, and tapered roller used in sample 8 was prepared by the same method as that for each of sample 1 and sample 2 described above. The lubrication in the rolling fatigue test was bath lubrication employing turbine oil VG56. A load in the rolling fatigue test was set to 17 kN, and an outer ring temperature was set to 65° C. In the rolling fatigue test, the inner ring was rotated at a rotating speed of 2000 rpm with the outer ring being fixed.

In the rolling fatigue test, evaluations were made in accordance with: an $L_{10}$ life (test time when a period of time from the start of the test until occurrence of flaking was statistically analyzed and a cumulative failure probability was 10%); and an $L_{50}$ life (test time when a period of time from the start of the test until occurrence of flaking was statistically analyzed and the cumulative failure probability was 50%).

Figure 24:
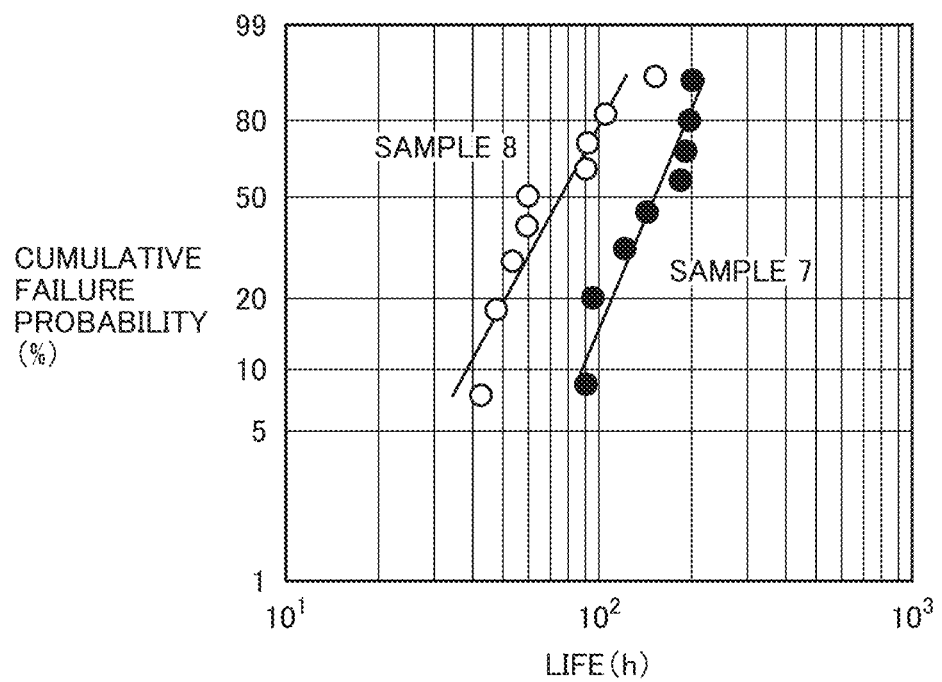
FIG. 24 is a graph showing a result of a rolling fatigue test on each of a sample 7 and a sample 8.

FIG. 24 is a graph showing a result of the rolling fatigue test on each of sample 7 and sample 8. It should be noted that in FIG. 24, the horizontal axis represents the life (unit: time), and the vertical axis represents the cumulative failure probability (unit: %). As shown in FIG. 24, in sample 7, the $L_{10}$ life was 89 hours, and the $L_{50}$ life was 152 hours. On the other hand, in sample 8, the $L_{10}$ life was 38 hours, and the $L_{50}$ life was 76 hours. Thus, it was confirmed that sample 7 had a long rolling fatigue life twice or more as large as that of sample 8.

<Wear Test>

A wear test was performed to the following samples: a sample 9 prepared in accordance with the same method as that for each of sample 1 and sample 2 described above; and a sample 10 prepared in accordance with the same method as that for each of sample 3 and sample 4 described above. The wear test was performed using a Savin type wear testing machine. Each of sample 9 and sample 10 had a flat-plate-like shape, and had a surface roughness (arithmetic mean roughness) Ra of 0.010 μm. A load in the test was set to 50 N and the relative speed with respect to a counterpart material was set to 0.05 m/s. The test time was set to 60 minutes, and Mobil Velocite Oil No. 3 (registered trademark) (VG2) was used for the lubricating oil. In the wear test, wear resistance was evaluated by calculating a specific wear amount from a wear amount of each sample having been through the test.

Figure 25:
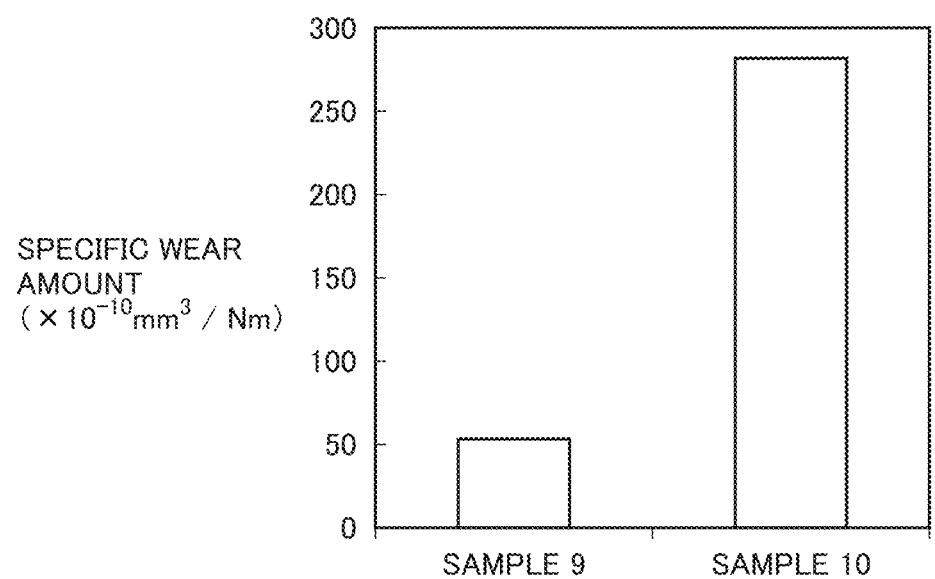
FIG. 25 is a graph showing a result of a wear test on a sample 9 and a sample 10.

FIG. 25 is a graph showing a result of the wear test on each of sample 9 and sample 10. In FIG. 25, the vertical axis represents the specific wear amount (unit: $10 \times 10^{-10}$ mm$^3$/N·m). As shown in FIG. 25, the specific wear amount in sample 9 was about 20% of the specific wear amount in sample 10.

Although the embodiments of the present invention have been illustrated, the embodiments described above can be modified in various manners. Further, the scope of the present invention is not limited to the above-described embodiments. The scope of the present invention is defined by the terms of the claims, and is intended to include any modifications within the scope and meaning equivalent to the terms of the claims.

INDUSTRIAL APPLICABILITY

The above-mentioned embodiment is particularly advantageously applied to a bearing part composed of a chromium molybdenum steel as well as a rolling bearing employing the bearing part.

REFERENCE SIGNS LIST

10: inner ring; 10a: inner circumferential surface; 10b: outer circumferential surface; 11: diffusion layer; 20: outer ring; 20a: inner circumferential surface; 20b: outer circumferential surface; 21: diffusion layer; 30: rolling element; 30a: surface; 40: cage; 100: rolling bearing; S1: preparing step; S2: carbonitriding step; S3: diffusion process; S4: primary quenching step; S41: holding step; S42: cooling step; S5: secondary quenching step; S51: holding step; S52: cooling step; S6: tempering step; S7: post-process step; D: depth.

The invention claimed is:

1. A bearing part composed of a chromium molybdenum steel, the bearing part comprising a diffusion layer in a surface of the bearing part, wherein
the diffusion layer includes a plurality of compound grains and a plurality of martensite blocks,
an average grain size of the compound grains is less than or equal to 0.3 μm,
an area ratio of the compound grains in the diffusion layer is more than or equal to 3%, and
a maximum grain size of the plurality of martensite blocks is less than or equal to 3.8 μm.

2. The bearing part according to claim 1, wherein
the plurality of martensite blocks include martensite blocks each having a crystal grain size of less than or equal to 1.0 μm and constituting a first group, and
a value obtained by dividing a total area of the martensite blocks belonging to the first group by a total area of the plurality of martensite blocks is more than or equal to 0.55 and less than or equal to 0.75.

3. The bearing part according to claim 2, wherein
the plurality of martensite blocks include martensite blocks belonging to a second group, and martensite blocks belonging to a third group,
a minimum value of crystal grain sizes of the martensite blocks belonging to the third group is larger than a maximum value of crystal grain sizes of the martensite blocks included in the second group,
a value obtained by dividing a total area of the martensite blocks belonging to the third group by a total area of the plurality of martensite blocks is more than or equal to 0.5,
a value obtained by dividing, by the total area of the plurality of martensite blocks, a total area of the martensite blocks belonging to the third group except for a martensite block that has a maximum crystal grain size and that belongs to the third group is less than 0.5, and
an average grain size of the martensite blocks belonging to the third group is more than or equal to 0.7 μm and less than or equal to 1.4 μm.

4. The bearing part according to claim 2, wherein
the plurality of martensite blocks include martensite blocks belonging to a fourth group, and martensite blocks belonging to a fifth group,
a minimum value of crystal grain sizes of the martensite blocks belonging to the fifth group is larger than a maximum value of crystal grain sizes of the martensite blocks included in the fourth group,
a value obtained by dividing a total area of the martensite blocks belonging to the fifth group by a total area of the plurality of martensite blocks is more than or equal to 0.7,
a value obtained by dividing, by the total area of the plurality of martensite blocks, a total area of the martensite blocks belonging to the fifth group except for a martensite block that has a maximum crystal grain size and that belongs to the fifth group is less than 0.7, and an average grain size of the martensite blocks belonging to the fifth group is more than or equal to 0.6 µm and less than or equal to 1.1 µm.

5. The bearing part according to claim 2, wherein the plurality of martensite blocks include martensite blocks belonging to a second group, and martensite blocks belonging to a third group, a minimum value of crystal grain sizes of the martensite blocks belonging to the third group is larger than a maximum value of crystal grain sizes of the martensite blocks included in the second group, a value obtained by dividing a total area of the martensite blocks belonging to the third group by a total area of the plurality of martensite blocks is more than or equal to 0.5, a value obtained by dividing, by the total area of the plurality of martensite blocks, a total area of the martensite blocks belonging to the third group except for a martensite block that has a maximum crystal grain size and that belongs to the third group is less than 0.5, and an average aspect ratio of the martensite blocks belonging to the third group is more than or equal to 2.5 and less than or equal to 2.8.

6. The bearing part according to claim 2, wherein the plurality of martensite blocks include martensite blocks belonging to a fourth group, and martensite blocks belonging to a fifth group, a minimum value of crystal grain sizes of the martensite blocks belonging to the fifth group is larger than a maximum value of crystal grain sizes of the martensite blocks included in the fourth group, a value obtained by dividing a total area of the martensite blocks belonging to the fifth group by a total area of the plurality of martensite blocks is 0.7, a value obtained by dividing, by the total area of the plurality of martensite blocks, a total area of the martensite blocks belonging to the fifth group except for a martensite block that has a maximum crystal grain size and that belongs to the fifth group is less than 0.7, and an average aspect ratio of the martensite blocks belonging to the fifth group is more than or equal to 2.4 and less than or equal to 2.6.

7. The bearing part according to claim 1, wherein the plurality of martensite blocks include martensite blocks belonging to a second group, and martensite blocks belonging to a third group, a minimum value of crystal grain sizes of the martensite blocks belonging to the third group is larger than a maximum value of crystal grain sizes of the martensite blocks included in the second group, a value obtained by dividing a total area of the martensite blocks belonging to the third group by a total area of the plurality of martensite blocks is more than or equal to 0.5, a value obtained by dividing, by the total area of the plurality of martensite blocks, a total area of the martensite blocks belonging to the third group except for a martensite block that has a maximum crystal grain size and that belongs to the third group is less than 0.5, and an average grain size of the martensite blocks belonging to the third group is more than or equal to 0.7 µm and less than or equal to 1.4 µm.

8. The bearing part according to claim 1, wherein the plurality of martensite blocks include martensite blocks belonging to a fourth group, and martensite blocks belonging to a fifth group, a minimum value of crystal grain sizes of the martensite blocks belonging to the fifth group is larger than a maximum value of crystal grain sizes of the martensite blocks included in the fourth group, a value obtained by dividing a total area of the martensite blocks belonging to the fifth group by a total area of the plurality of martensite blocks is more than or equal to 0.7, a value obtained by dividing, by the total area of the plurality of martensite blocks, a total area of the martensite blocks belonging to the fifth group except for a martensite block that has a maximum crystal grain size and that belongs to the fifth group is less than 0.7, and an average grain size of the martensite blocks belonging to the fifth group is more than or equal to 0.6 µm and less than or equal to 1.1 µm.

9. The bearing part according to claim 1, wherein the plurality of martensite blocks include martensite blocks belonging to a second group, and martensite blocks belonging to a third group, a minimum value of crystal grain sizes of the martensite blocks belonging to the third group is larger than a maximum value of crystal grain sizes of the martensite blocks included in the second group, a value obtained by dividing a total area of the martensite blocks belonging to the third group by a total area of the plurality of martensite blocks is more than or equal to 0.5, a value obtained by dividing, by the total area of the plurality of martensite blocks, a total area of the martensite blocks belonging to the third group except for a martensite block that has a maximum crystal grain size and that belongs to the third group is less than 0.5, and an average aspect ratio of the martensite blocks belonging to the third group is more than or equal to 2.5 and less than or equal to 2.8.

10. The bearing part according to claim 1, wherein the plurality of martensite blocks include martensite blocks belonging to a fourth group, and martensite blocks belonging to a fifth group, a minimum value of crystal grain sizes of the martensite blocks belonging to the fifth group is larger than a maximum value of crystal grain sizes of the martensite blocks included in the fourth group, a value obtained by dividing a total area of the martensite blocks belonging to the fifth group by a total area of the plurality of martensite blocks is 0.7, a value obtained by dividing, by the total area of the plurality of martensite blocks, a total area of the martensite blocks belonging to the fifth group except for a martensite block that has a maximum crystal grain size and that belongs to the fifth group is less than 0.7, and an average aspect ratio of the martensite blocks belonging to the fifth group is more than or equal to 2.4 and less than or equal to 2.6.

11. The bearing part according to claim 1, wherein an average grain size of prior austenite grains in the diffusion layer is less than or equal to 8 µm.

12. The bearing part according to claim 1, wherein an average carbon concentration in the diffusion layer between the surface and a position distant away by 10 µm from the surface is more than or equal to 0.7 mass %, and an average nitrogen concentration in the diffusion layer between the surface and the position distant away by 10 μm from the surface is more than or equal to 0.2 mass %.

13. The bearing part according to claim 1, wherein the chromium molybdenum steel is SCM435 defined in JIS.

14. A rolling bearing comprising:
an outer ring composed of a chromium molybdenum steel, the outer ring having an inner circumferential surface provided with a first raceway surface;
an inner ring composed of a chromium molybdenum steel, the inner ring having an outer circumferential surface provided with a second raceway surface, the inner ring being disposed such that the second raceway surface faces the first raceway surface; and
a rolling element composed of a chromium molybdenum steel, the rolling element being disposed rollably between the first raceway surface and the second raceway surface, the rolling element having a rolling contact surface, wherein
a diffusion layer is provided in at least one of the first raceway surface, the second raceway surface, and the rolling contact surface,
the diffusion layer includes a plurality of compound grains and a plurality of martensite blocks,
an average grain size of the compound grains is less than or equal to 0.3 μm,
an area ratio of the compound grains in the diffusion layer is more than or equal to 3%, and
a maximum grain size of the plurality of martensite blocks is less than or equal to 3.8 μm.

* * * * *